(12) United States Patent
Nakai

(10) Patent No.: US 6,914,705 B2
(45) Date of Patent: Jul. 5, 2005

(54) OPTICAL SCANNING DEVICE

(75) Inventor: Yoko Nakai, Fuchu (JP)

(73) Assignee: Fujinon Corporation, Saitama (JP)

( * ) Notice: Subject to any disclaimer, the term of this patent is extended or adjusted under 35 U.S.C. 154(b) by 95 days.

(21) Appl. No.: 10/606,887

(22) Filed: Jun. 27, 2003

(65) Prior Publication Data

US 2004/0001240 A1 Jan. 1, 2004

(30) Foreign Application Priority Data

Jun. 28, 2002 (JP) .................................. 2002-190429

(51) Int. Cl.$^7$ ............................................. G02B 26/08
(52) U.S. Cl. ..................... 359/204; 359/205; 359/207; 359/216; 347/243; 347/244
(58) Field of Search ................................. 359/204–207; 347/243–244

(56) References Cited

U.S. PATENT DOCUMENTS

| | | | |
|---|---|---|---|
| 4,547,038 A | 10/1985 | Mori | |
| 5,208,456 A | 5/1993 | Appel et al. | |
| 5,526,166 A | 6/1996 | Genovese | |
| 6,313,906 B1 | 11/2001 | Nagasaka et al. | |
| 6,346,957 B1 | * | 2/2002 | Maruyama .................. 347/115 |
| 2001/0002152 A1 | * | 5/2001 | Ohno et al. | |

* cited by examiner

*Primary Examiner*—James Phan
(74) *Attorney, Agent, or Firm*—Arnold International; Jon W. Henry; Bruce Y. Arnold

(57) ABSTRACT

An optical scanning device for scanning a plurality of light beams on scanned surfaces, such as photosensitive drums, includes a light source, a front optical system, a deflector (e.g., a rotating polygon mirror) that scans the light beams in a main scanning direction, and a rear optical system for directing the light beams toward the scanned surfaces so that two of the light beams are parallel in a sub-scanning direction that is orthogonal to the main scanning direction and two of the light beams diverge in the sub-scanning direction in the rear optical system. The front optical system includes collimating and converging optical systems. The rear optical system includes cylindrical lens parts that are oppositely inclined relative to the optical axis in a plane that includes the sub-scanning direction so as to correct curvatures of the scanning lines.

26 Claims, 16 Drawing Sheets

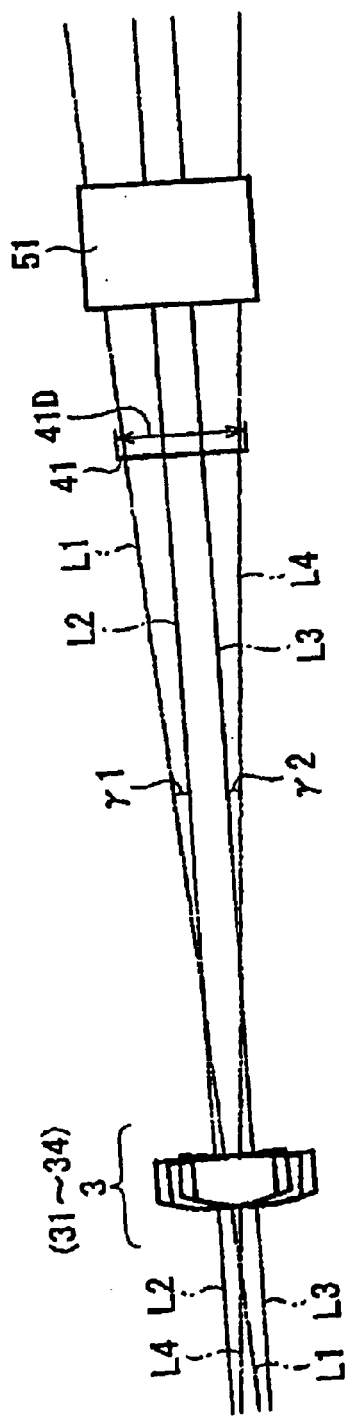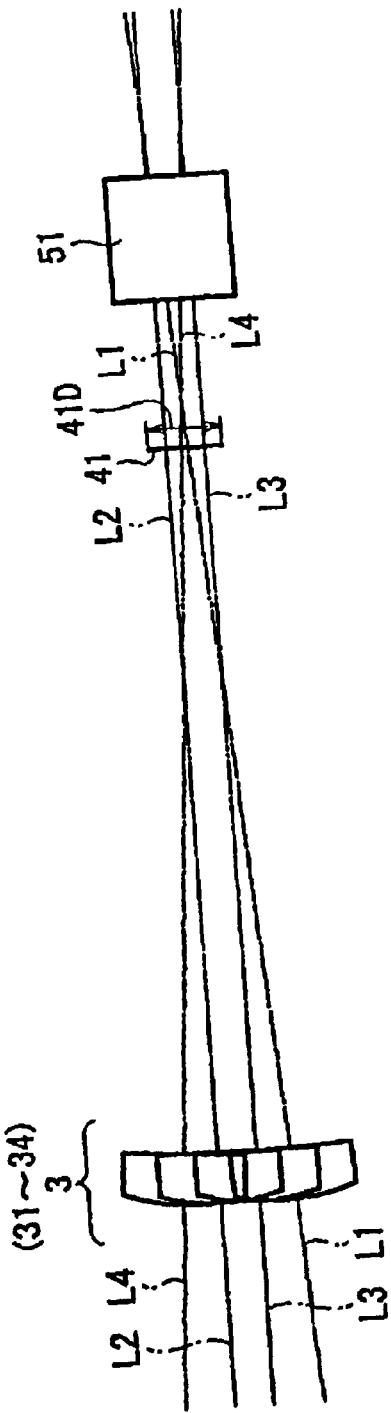
Fig. 5A
Fig. 5B

OPTICAL SCANNING DEVICE

CROSS REFERENCE TO RELATED APPLICATION

This application is related in subject matter to commonly assigned U.S. application Ser. No. 10/397,301, filed Mar. 27, 2003, entitled "Optical Scanning System".

BACKGROUND OF THE INVENTION

Optical scanning devices are conventionally used to form images in laser beam printers and similar devices. An optical scanning device emits a light beam, conventionally a laser beam, that scans as a light spot along a scanned surface where photosensitive material is present. More precisely, the optical scanning device includes a collimator lens to collimate a light beam emitted from a light source, such as a semiconductor laser device, and then uses an optical deflector such as a high-speed rotating polygon mirror in order to deflect the collimated light beam onto a scanned surface, such as a photosensitive drum surface.

Multi-beam scanners that simultaneously use plural light beams to scan are in development for laser printers, including color laser printers. A multi-beam scanner uses an optical system to guide plural light beams emitted from a light source to a shared polygon mirror. The polygon mirror is rotated to reflect the plural light beams to different points on scanned surfaces. In order to guide the plural light beams to multiple scanned surfaces from a shared polygon mirror, the plural light beams have to be separated from one another. Therefore, a separation optical system such as a splitting mirror is provided between the polygon mirror and the scanned surfaces.

Recent demand for higher printing speed requires higher scanning speed, which in turn requires higher rotation rates of the polygon mirror. To achieve higher rotation rates, the polygon mirror must be made smaller and lighter. For that to occur, it is important that the polygon mirror have a small thickness in the sub-scanning direction that is generally parallel to the axis of rotation of the polygon mirror and that is orthogonal to the main scanning direction in which rotation of the polygon mirror causes the laser beams to scan.

The multi-beam scanner includes plural light beams arranged in the sub-scanning direction. Therefore, the polygon mirror has a larger thickness in the sub-scanning direction than that of a single beam scanner. Consequently, the polygon mirror is heavier and less compact. It is understood that the plurality of light beams may be spaced closer together in order to reduce the thickness of the polygon mirror in the sub-scanning direction. However, a limitation is imposed on this close spacing by the fact that the plurality of light beams must be separable on the image side of the polygon mirror. Thus, it is difficult in conventional multi-beam scanners to make the polygon mirror thin in the sub-scanning direction as required to increase printing speed.

BRIEF SUMMARY OF THE INVENTION

The present invention relates to an optical scanning device in which plural light beams are spaced so as to be separable on the image side of an optical deflector and the optical deflector has a small thickness in the sub-scanning direction so that high speed printing can be realized in such an optical scanning device, such as a laser printer.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 5A–5B show enlarged cross-sectional views in the main scanning direction of two modifications of a portion of the optical scanning device of FIG. 1;

DETAILED DESCRIPTION

Figure 1:
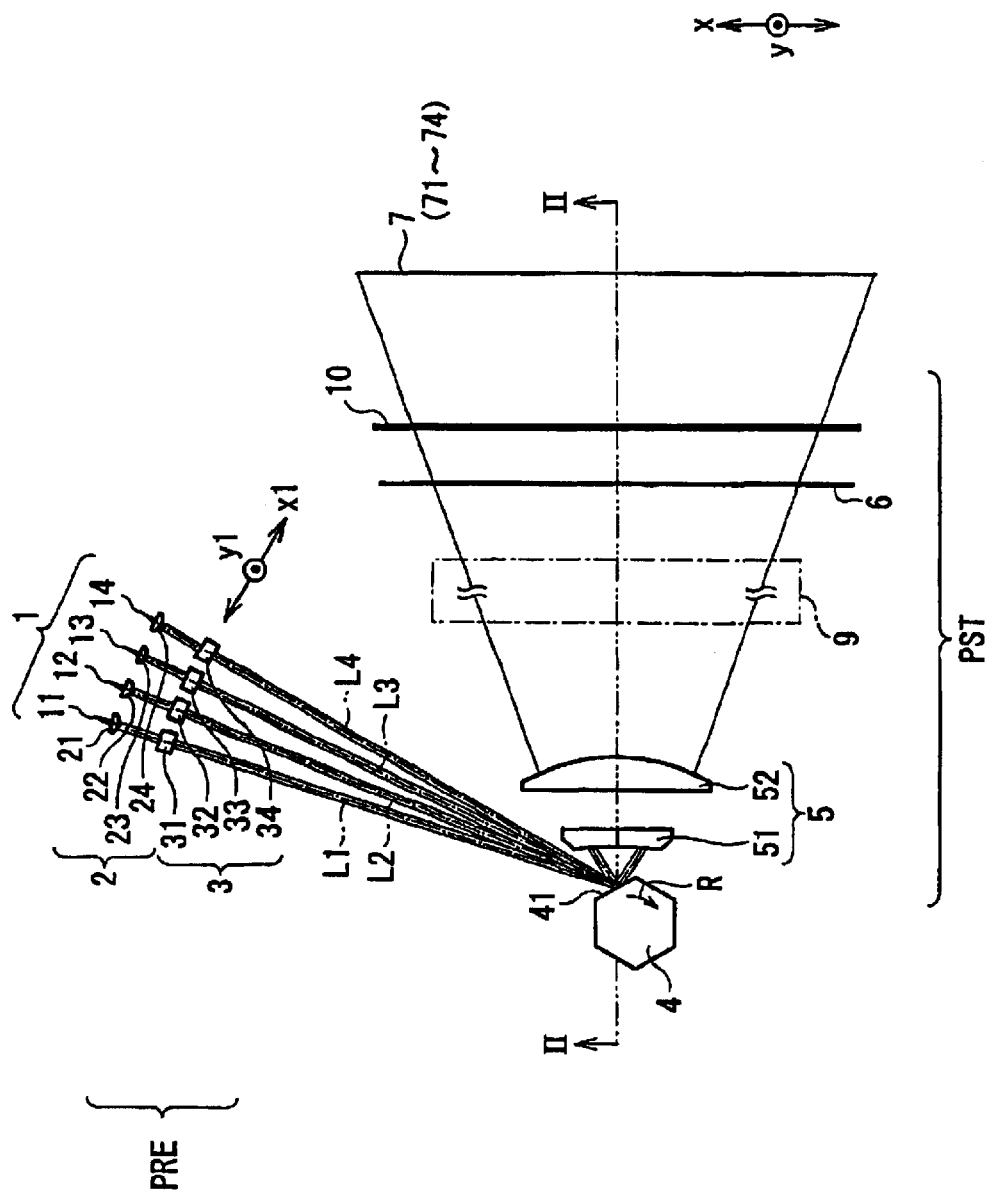
FIG. 1 shows a plan view of the basic components of the optical scanning device of a preferred embodiment of the invention in the plane that includes the main scanning direction.
Figure 2:
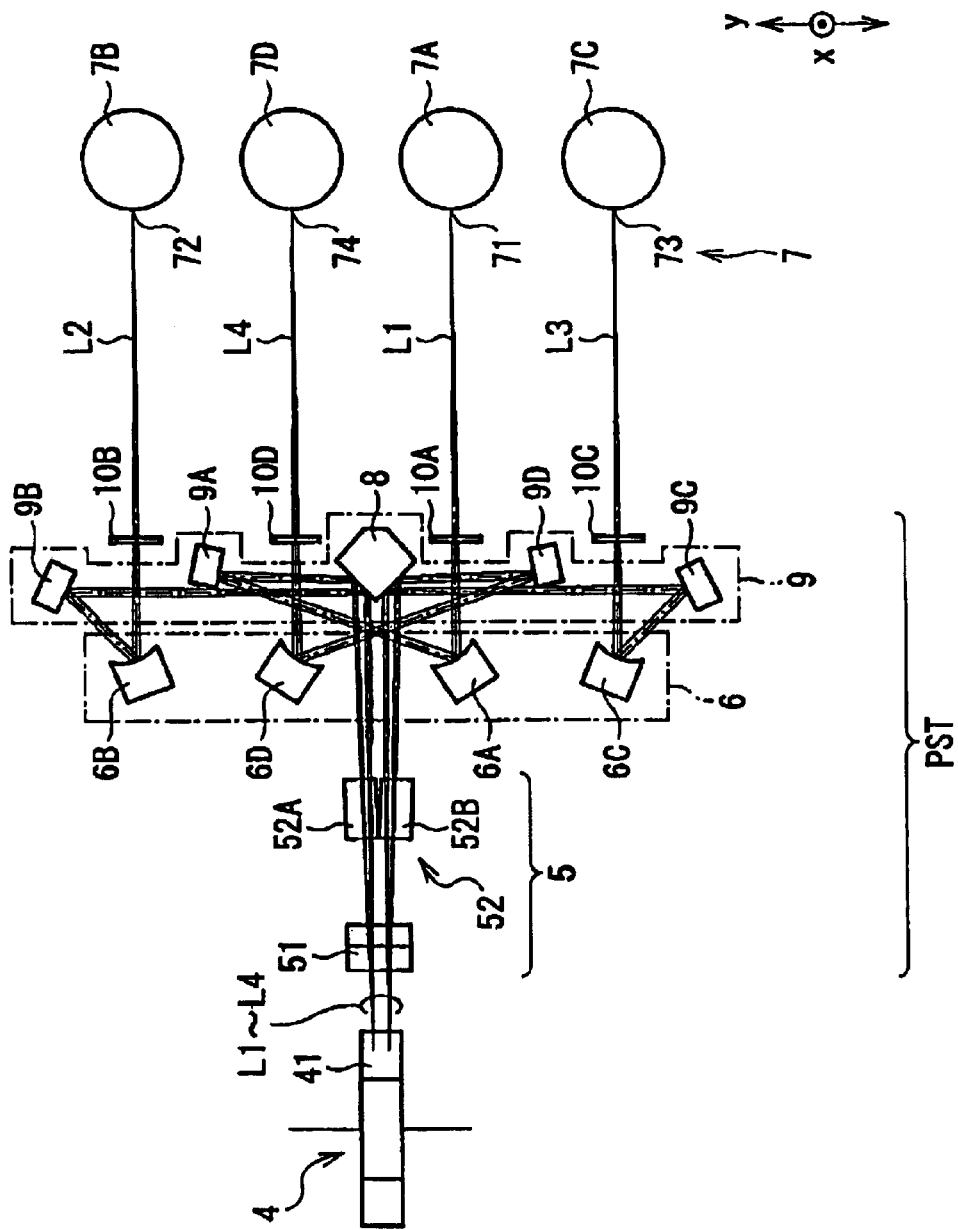
FIG. 2 shows a cross-sectional view along line II—II of FIG. 1.

The present invention will now be described in terms of preferred embodiments of the invention with reference to the attached drawings. First, a preferred embodiment will be described with reference to FIGS. 1 and 2. FIG. 1 shows a plan view of the basic components of the optical scanning device of a preferred embodiment of the invention in the plane that includes the main scanning direction. FIG. 2 shows a cross-sectional view along line II—II of FIG. 1, which is a plane that includes the sub-scanning direction. The splitting mirror 8 and folding mirrors 9A to 9D (that will be described later) in FIG. 2 are omitted in FIG. 1, and the folded optical paths are shown as straightened in FIG. 1.

The optical scanning device of FIG. 1 can be used, for example, in a color laser printer. As shown in FIG. 1, four light beams L1 to L4 are guided to a scanned surface 7 to form light spots that move on the scanned surface 7 in a first direction at a fixed speed for optical scanning. The direction in which the light spots move is the main scanning direction x (that defines an x-axis) and the direction orthogonal to it (orthogonal to the plane of FIG. 1) is the sub-scanning direction y (that defines a y-axis). The scanned surface 7 moves in the sub-scanning direction y.

The optical scanning device includes a light source 1 that emits plural light beams, a front optical system PRE provided in the optical path of the light beams L1 to L4 from the light source 1, a polygon mirror 4 which is used as an optical deflector that is positioned at the rear of the front optical system and shared by the light beams L1 to L4, and a rear optical system PST provided between the polygon mirror 4 and the scanned surface 7. In the description which follows, "front" refers to the light source side of the polygon mirror 4 and "rear" refers to the side after reflection from the polygon mirror 4.

The front optical system PRE includes a first optical system 2 for collimating the plural light beams from the light source 1 and a second optical system 3 for converging each of the collimated light beams in the sub-scanning direction y that is orthogonal to the first direction. The polygon mirror 4 serves to collectively deflect the light beams L1 to L4 from the front optical system PRE so as to scan the beams in a first direction that is parallel to the x-axis. The rear optical system PST serves at least to separate from one another, in a second direction that is parallel to the y-axis, the light beams L1 to L4 that have been deflected by the polygon mirror 4 before they are incident on the scanned surface 7.

The light source 1 of the optical scanning device includes four light sources 11 to 14, arranged along a first direction x1 that corresponds to a main scanning direction, that emit the light beams L1 to L4, respectively. The two inner light sources 12 and 13 emit the light beams L2 and L3 so that they are parallel to each other in a plane that includes a second direction y1 that may correspond to the sub-scanning direction y. On the other hand, the two outer light sources 11 and 14 emit the light beams L1 and L4 so that they approach each other in a plane that includes the second direction y1. Each of the light sources 11 to 14 includes a semiconductor laser element and emits, for example, a light beam having a wavelength of 780 nm. The light sources are controlled by a control part (not shown in the drawings) so as to independently emit the light beams L1 to L4. The light beams L1 to L4 are merely exemplary light beams of the embodiment of FIG. 1.

Collimator lenses 21 to 24 are provided on the exit side of the light sources 11 to 14 to form a first optical system 2 of the front optical system PRE. Collimator lenses 21 to 24 of the first optical system 2 collimate the diverging light beams L1 to L4 from the light sources 11 to 14, respectively.

A second optical system 3 of the front optical system PRE is provided after the collimator lenses 21 to 24. The second optical system 3 includes four cylindrical lenses 31 to 34. The cylindrical lenses 31 to 34 each have positive refractive power in the second direction for converging each of the four light beams L1 to L4 in the second direction. Each of the cylindrical lenses 31 to 34 can be formed of a single lens element or plural lens elements.

The polygon mirror 4 provided after the cylindrical lenses 31 to 34 is shared by the plural light beams L1 to L4. The polygon mirror 4 deflects the plural light beams transmitted by the second optical system 3 to change their directions of travel along the first direction, that is, the main scanning direction. More precisely, the polygon mirror 4 is, for example, a hexagonal mirror made as a hexagonal column with six facets, each facet carrying a reflecting surface 41. The plural light beams from the second optical system 3 strike the reflecting surfaces 41 with separations from one another in the second direction, that is, the sub-scanning direction. The polygon mirror 4 is rotated at a fixed speed (for example, 5000 to 20,000 revolutions per minute) in the direction indicated by the arrow R in FIG. 1 around the rotation axis orthogonal to the plane of FIG. 1. The polygon mirror 4 is rotated to change the angles of incidence and thus the reflecting angles of the light beams L1 to L4 so as to change the direction of travel of the light beams L1 to L4 along the first direction, that is, along the main scanning direction.

The polygon mirror 4 is followed by a third optical system 5 that includes a first rear cylindrical lens 51 and a second rear cylindrical lens 52. The third optical system 5 serves as an f·θ lens to regulate the scanning speed on the scanned surface 7 so as to be constant. The first rear cylindrical lens 51 has a negative refractive power in the first direction and the second rear cylindrical lens 52 has a positive refractive power in the first direction. The third optical system 5 has an overall positive refractive power in the first direction to converge the light beams L1 to L4 from the polygon mirror 4 in the first direction, that is, in the main scanning direction.

Referring to FIG. 2, the second rear cylindrical lens 52 includes a first lens part 52A and a second lens part 52B that are adjacent to each other in the second direction. The first and second lens parts 52A and 52B are inclined at different angles corresponding to the incident angles of the light beams L1 to L4, or are not inclined, as will be described later.

As shown in FIG. 2, the third optical system 5 is followed by a separation optical system 9 that includes a splitting mirror 8 and folding mirrors 9A to 9D. The splitting mirror 8 separates the light beams L1 and L2 from the light beams L3 and L4, which all come from the third optical system 5. The splitting mirror 8 is formed, for example, as a rectangular column extending in the first direction, which is orthogonal to the plane of FIG. 2. The longitudinal direction of the rectangular column is parallel to the longitudinal direction of the second rear cylindrical lens 52. Two facets of the splitting mirror 8 face the second rear cylindrical lens 52 and are orthogonal to each other so as to form reflecting surfaces that are inclined by ±45° in relation to the direction in which the light beams L1 to L4 proceed, that is, the center line direction of the four light beams after they pass through the second rear cylindrical lens 52.

The light beams L1 to L4 strike the splitting mirror 8 in a vertical row as shown in FIG. 2. As shown in FIG. 2, the top two light beams L1 and L2 are reflected upward and the light beams L3 and L4 are reflected downward. After being reflected by the splitting mirror 8, the light beam L1 strikes the folding mirror 9A and the light beam L2 strikes the folding mirror 9B. Furthermore, the light beam L3 strikes the folding mirror 9C and the light beam L4 strikes the folding mirror 9D.

The folding mirrors 9A to 9D are followed by a fourth optical system 6 that includes, for example, cylindrical mirrors 6A to 6D. The fourth optical system 6 serves to converge each of the light beams L1 to L4 from the folding mirrors 9A to 9D mainly in the second direction. Here, it is preferred that the fourth optical system 6 that includes cylindrical mirrors 6A to 6D have a positive power at least in the second direction. The cylindrical mirror 6A reflects the light beam L1 from the reflecting mirror 9A to converge it in the second direction and the cylindrical mirror 6B reflects the light beam L2 from the reflecting mirror 9B to converge it in the second direction. Similarly, the cylindrical mirror 6C reflects the light beam L3 from the reflecting mirror 9C to converge it in the second direction, and the cylindrical mirror 6D reflects the light beam L4 from the reflecting mirror 9D to converge it in the second direction.

The fourth optical system 6 is followed by cover glasses 10A to 10D at positions corresponding to the cylindrical mirrors 6A to 6D, respectively. The cover glass 10A transmits the light beam L1 from the cylindrical mirror 6A to correct its scanning line curvature on the scanned surfaces 7. The cover glass 10B transmits the light beam L2 from the cylindrical mirror 6B to correct its scanning line curvature on the scanned surfaces 7. Similarly, the cover glasses 10C and 10D transmit the light beams L3 and L4 from the cylindrical mirrors 6C and 6D, respectively, to correct their scanning line curvature on the scanned surfaces 7. The scanning line curvature and the correction of the curvatures will be described later.

The cover glasses 10A to 10D are followed by the scanned surfaces 7. The scanned surfaces 7 are, for example, layers of photosensitive material, such as selenium, formed on four photosensitive drums 7A to 7D which are oriented with their cylindrical axes parallel to one another. The photosensitive drums 7A to 7D include scanned surfaces 71 to 74, respectively. Each of the scanned surfaces 71 to 74 is scanned by one of the light beams L1 to L4.

The operation of the optical scanning device having the above structure will be described below, with reference to FIGS. 1 and 2. Upon receipt of an image forming start command by an external device, such as a computer, the polygon mirror 4 starts rotating. Then, the photosensitive drums 7A to 7D are rotated and four light sources of the light source 1 are modulated and activated to emit the light beams L1 to L4 based on input image information. After passing through the collimator lenses 21 to 24, respectively, each of the light beams L1 to L4 is at least approximately collimated. The collimated light beams L1 to L4 are focused to line images in the second direction, the sub-scanning direction, near the reflecting surface 41 of the polygon mirror 4 by the refractive power in the second direction of the cylindrical lenses 31 to 34. Here, the line images are linear in the first direction, that is, the main scanning direction.

The light beams L1 to L4, reflected by the polygon mirror 4, pass through the first rear cylindrical lens 51 and the second rear cylindrical lens 52 so as to converge in the first direction. Then, they are reflected sequentially by the splitting mirror 8, reflecting mirrors 9A to 9D, and cylindrical mirrors 6A to 6D to form images on the scanned surfaces 71 to 74, respectively. After they form images in the second direction near the reflecting surface 41 of the polygon mirror 4, the light beams L1 to L4 proceed while diverging in the second direction. However, individually the light beams L1 to L4 converge in the second direction by the positive power of the cylindrical mirrors 6A to 6D and, finally, form circular spots on the scanned surfaces 71 to 74.

In this way, the surfaces of the photosensitive drums 7A to 7D are exposed and electrostatic latent images are formed thereon based on different color image data. Different color toners having the opposite charge to the electrostatic latent image are deposited on the image region of the photosensitive drums 7A to 7D to transfer the images to recording paper. This is followed by the fixing process in which the color images are fixed on the recording paper.

The optical effects of the optical scanning device of the present invention will now be described with reference to FIGS. 3, 4, and 6–13, as well as FIG. 5 that will be described with regard to modifications of the optical scanning device. First, the optical effects of the second optical scanning system 3 will be compared to a comparative embodiment.

Figure 3:
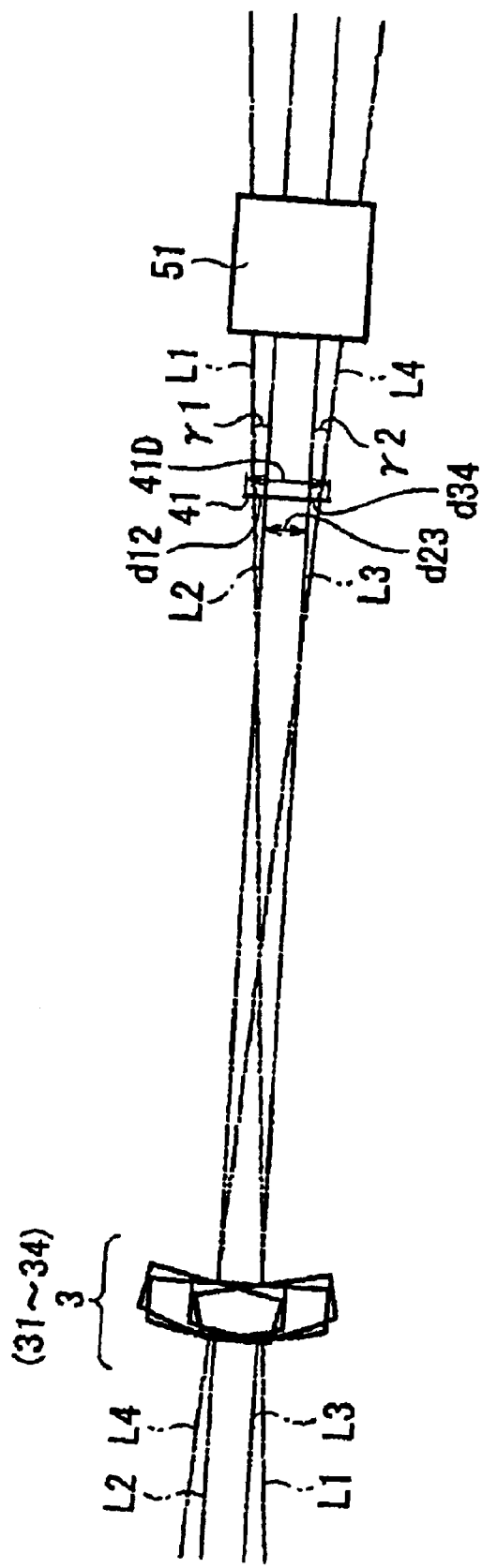
FIG. 3 shows an enlarged cross-sectional view in the sub-scanning direction of a portion of the optical scanning device of FIG. 1.
Figure 4:
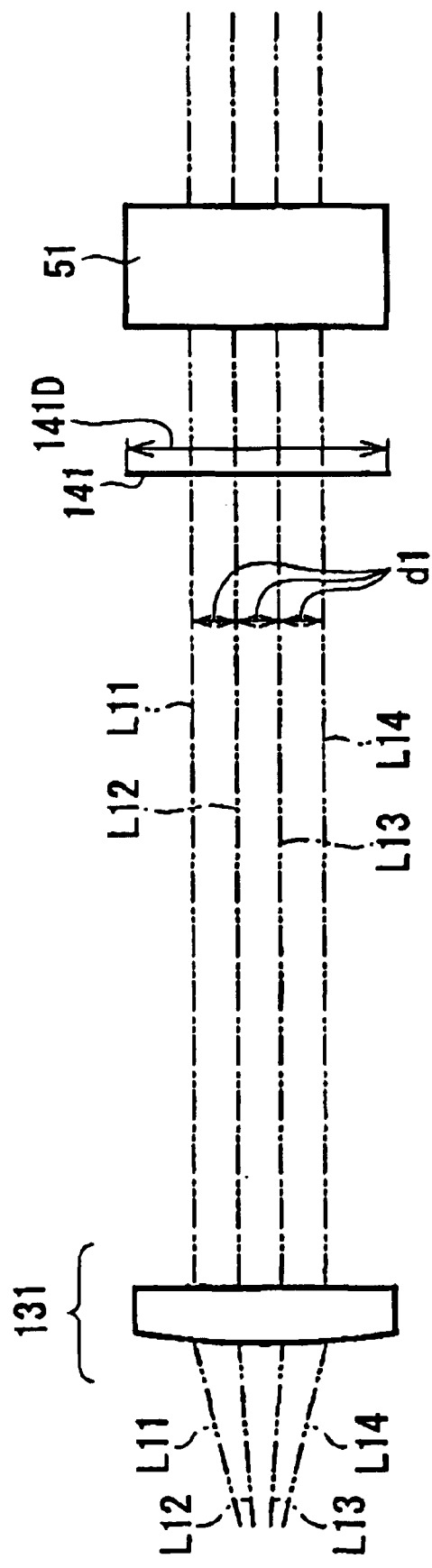
FIG. 4 shows an enlarged cross-sectional view in the sub-scanning direction of a portion of the optical scanning device of a comparative example to that of FIG. 3.

FIG. 3 shows an enlarged cross-sectional view in the sub-scanning direction of a portion of the optical system of FIG. 1. FIG. 4 shows an enlarged cross-sectional view in the sub-scanning direction of a portion of the optical system of a comparative example to that of FIG. 3. Light emitted from the light source 1 and passing through the collimator lenses 21 to 24 pass through the cylindrical lenses 31 to 34, respectively, as light beams L1 to L4 before they reach the reflecting surface 41 of the polygon mirror 4. After reflection by the reflecting surface 41, the light beams L1 to L4 enter the first rear cylindrical lens 51. FIG. 3 shows the cylindrical lenses 31–34 in overlapping relationship in the first direction orthogonal to the plane of FIG. 3. In practice, the cylindrical lenses 31 to 34 are shifted slightly in the vertical direction as shown in FIG. 3. In particular, the light beams L2 and L3 pass through the cylindrical lenses 32 and 33 at their centers.

As shown in FIG. 3, the collimated light beams L1 to L4 as they exit the collimator lenses 21 to 24 (not shown in FIG. 3) are in the order of L4, L2, L3, and L1 from top to bottom and enter the cylindrical lenses 31 to 34. The cylindrical lenses 31 to 34 each have positive refractive power in the second direction. Therefore, the transmitted light beams L1 to L4 form images in the second direction near the reflecting surface 41 with their diameters reduced in the second direction. FIG. 3 does not show the widths of the light beams. Among the light beams L1 to L4 that have passed through the cylindrical lenses 31 to 34, the light beams L2 and L3 travel parallel to each other before they reach the reflecting surface 41. On the other hand, the light beams L1 and L4 intersect each other before they reach the reflecting surface 41 of the polygon mirror 4. It is preferred that the parallel light beams L2 and L3 strike the reflecting surface 41 at a right angle. This eliminates the possibility of the following third optical system 5 causing curvature in the scanning lines of the light beams L2 and L3 on the scanned surfaces 72 and 73, as will be described later.

Among the light beams L1 to L4 that have formed images in the second direction near the reflecting surface 41 of the polygon mirror 4, the light beams L2 and L3 travel parallel to each other in the plane including the second direction (that is, the plane perpendicular to the first direction) and enter the first rear cylindrical lens 51 of the rear optical system PST. The light beams L1 and L4 enter the first rear cylindrical lens 51 at angles that allow them to separate from each other in the plane including the second direction. Here, the light beams L1 and L4 enter the first rear cylindrical lens 51 at the positions outside the light beams L2 and L3. Assuming the light beams L1 and L2 make an angle of γ1 and the light beams L3 and L4 make an angle of γ2, it is preferred that γ1=γ2.

A comparative embodiment of the optical scanning device will now be described with reference to FIG. 4. In the comparative embodiment shown in FIG. 4, light beams L11 to L14 emitted by the light source 1 pass through the collimator lenses 21 to 24 (not shown in FIG. 4) so as to become collimated light and then pass through a single cylindrical lens 131 having positive refractive power in the second direction before they reach a reflecting surface 141.

After passing through the collimator lenses 21 to 24 (not shown in FIG. 4), the collimated light beams L11 to L14 enter the cylindrical lens 131 at specified angles. They are aligned in the second direction in the order of L11, L12, L13, and L14 from the top in FIG. 4. Because the cylindrical lens 131 has positive refractive power, the light beams L11 to L14 that have passed through the cylindrical lens 131 travel in parallel and with their diameters reduced to form images in the second direction near the reflecting surface 41. Here, the light beams L11 to L14 strike the reflecting surface 141 at a right angle with their spacings maintained and parallel to each other so as to avoid curved scanning lines being formed on the scanned surface 7 at a later stage. The light beams L11 to L14 reflected by the reflecting surface 141 maintain their spacings and enter the following separation optical system with the same spacings.

In the comparative embodiment of FIG. 4, the spacings of the light beams L11 to L14 are determined so that they are separable by the following separation optical system. Assuming that d1 is the minimum distance for which the separation optical system is able to separate light beams, d1 is also the acceptable minimum spacing of the light beams L11 to L14 at the reflecting surface 141. Accordingly, the reflecting surface 141 has to have a width 141D of (3×d1) or larger in the second direction.

Conversely, in the optical scanning device of the present invention, as shown in FIG. 3, among the light beams L1 to L4 that have passed through the cylindrical lenses 31 to 34, light beams L2 and L3 are maintained parallel to each other when they strike the reflecting surface 41 and then reach the first rear cylindrical lens 51 and the light beams L1 and L4 intersect and gradually separate from each other in the second direction before they reach the reflecting surface 41 and rear cylindrical lens 51. Thus, the spacing d23 between the parallel light beams L2 and L3 can be as small as the minimum distance d1 and the spacing d12 between the light beams L1 and L2 and the spacing d34 between the light beams L3 and L4 can be smaller than the minimum spacing d1 on the reflecting surface 41 of the polygon mirror 4. Among the light beams L1 to L4 reflected by the reflecting surface 41 of the polygon mirror 4, the light beams L1 and L4 reach the separation optical system 9 with their spacings further increased in the second direction. Therefore, the spacing d12 between the light beams L1 and L2 and the spacing d34 between the light beams L3 and L4 become larger than the minimum spacing d1 when these light beams enter the separation optical system, although they are smaller than the minimum spacing d1 on the reflecting surface 41 of the polygon mirror 4.

As a result, in the present invention, the minimum width 41D (=d12+d23+d34=d1+(d12+d34)) in the second direction of the reflecting surface 41 can be smaller than the minimum width 141D (=3×d1). This allows the polygon mirror 4 to have reduced thickness in the second direction. In particular, the polygon mirror 4 can have the most reduced thickness when the light beams L1 and L2 intersect each other on the reflecting surface 41 and so do the light beams L3 and L4. This is because the spacing d12 between the light beams L1 and L2 and the spacing d34 between the light beams L3 and L4 become zero and, therefore, the minimum width 41D can be nearly equal to the spacing d23 between the light beams L2 and L3.

Figure 6A:
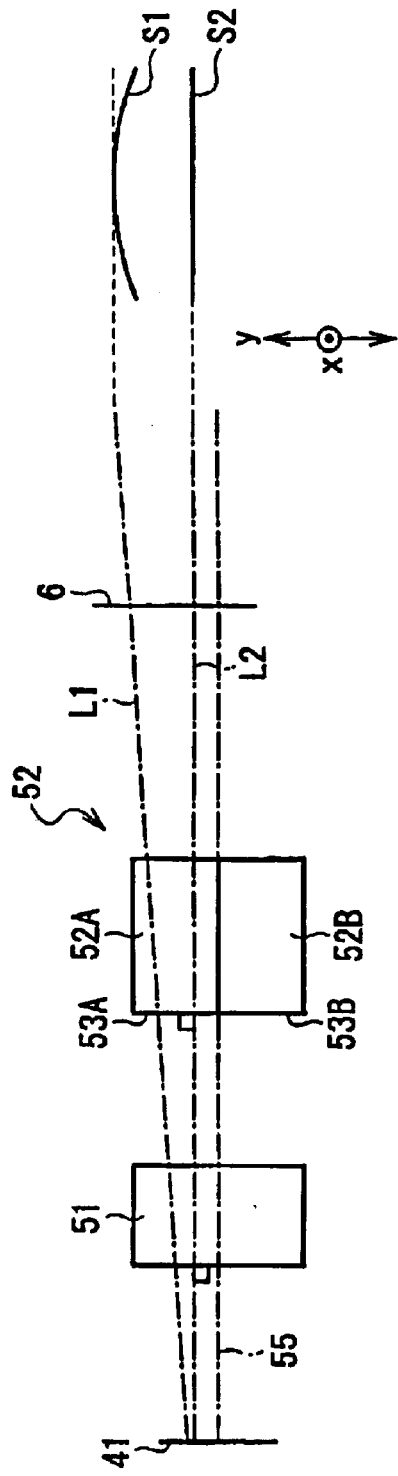
FIGS. 6A–6B, 7A–7B, and 8A–8B show enlarged side views in the same direction as FIG. 2 of three alternative embodiments of a rear portion of the optical scanning device of the present invention.
Figure 6B:
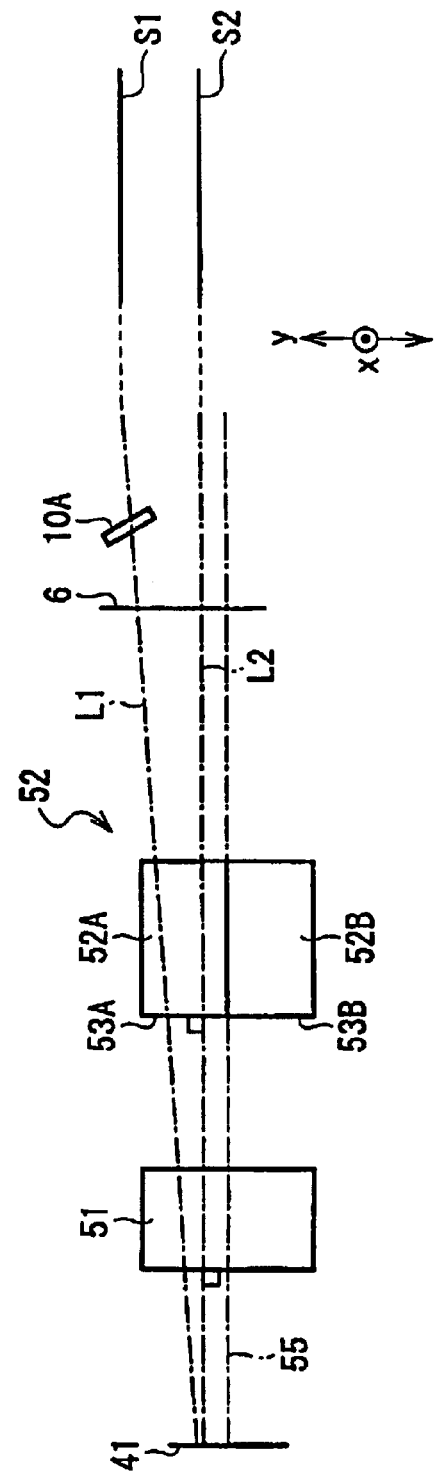
Figure 7A:
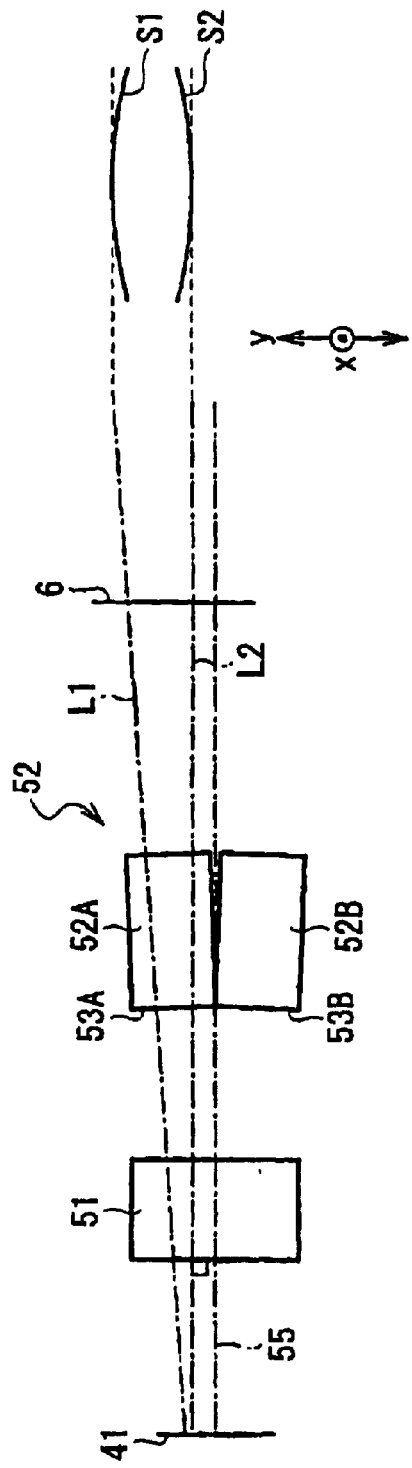
Figure 7B:
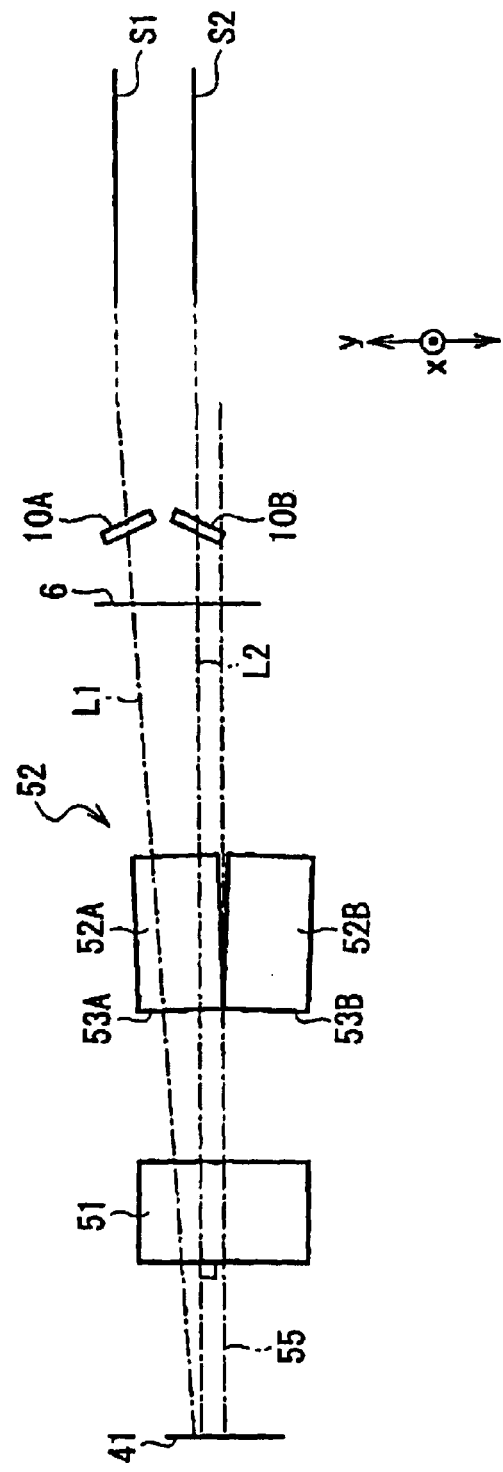
Figure 8A:
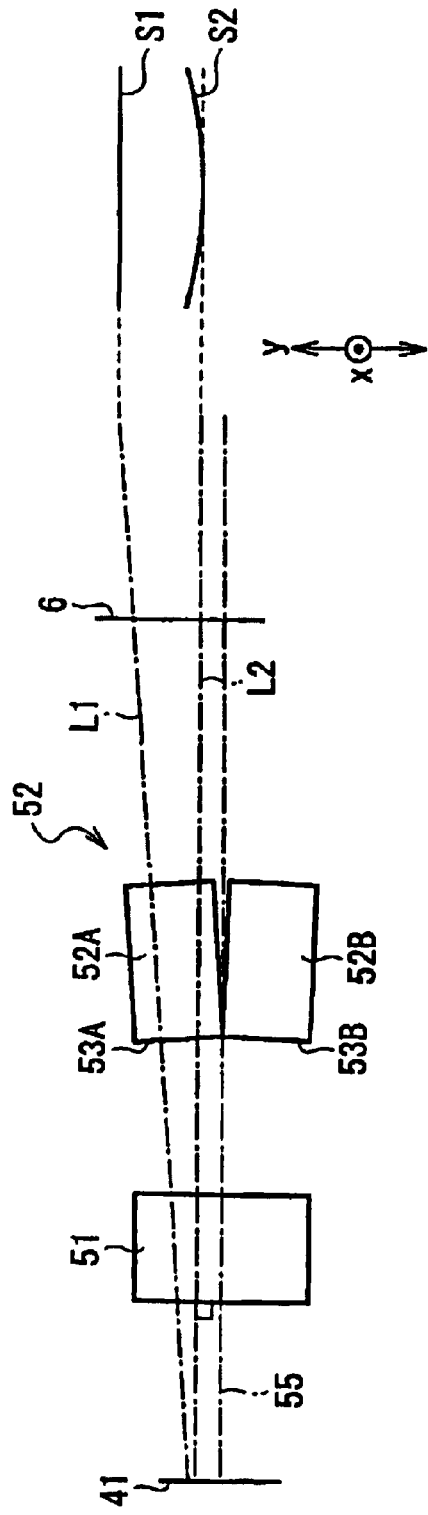
Figure 8B:
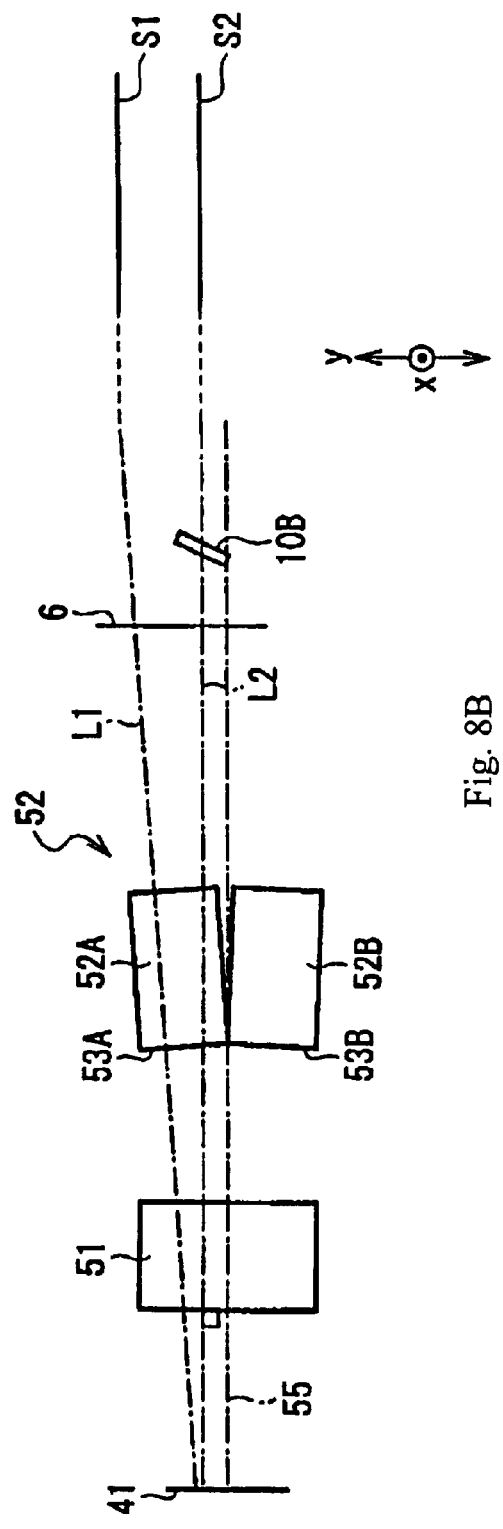
Figure 9A:
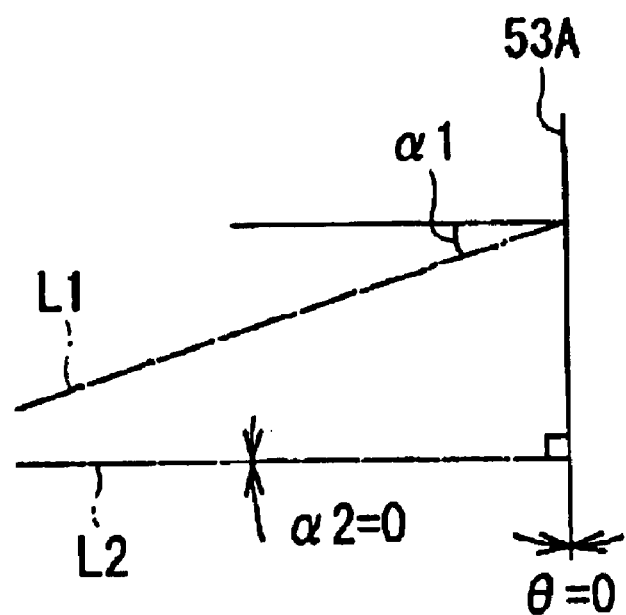
FIG. 9A shows a simplified enlarged view of the light incident surface of a lens part shown in FIG. 6A.
Figure 9B:
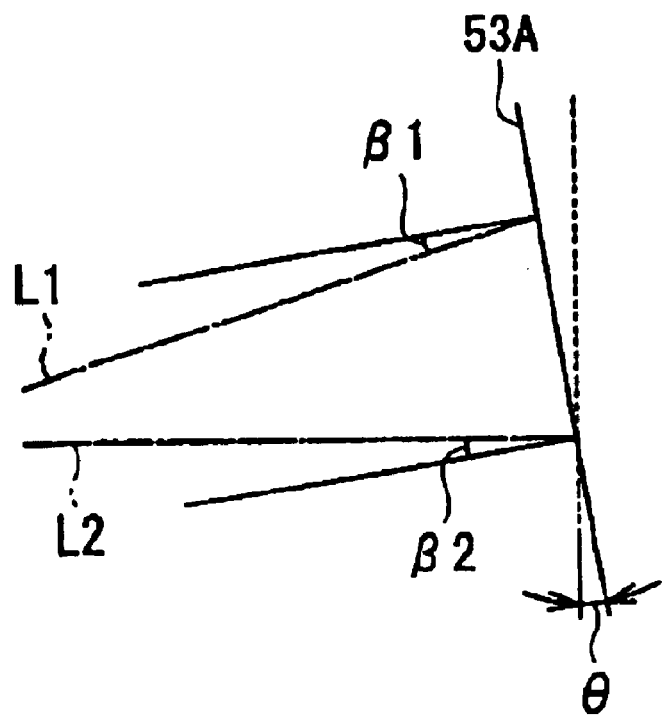
FIG. 9B shows a simplified enlarged view of a portion of the light incident surface of a lens part corresponding to light incidence surfaces shown in FIGS. 7A and 8A.
Figure 12:
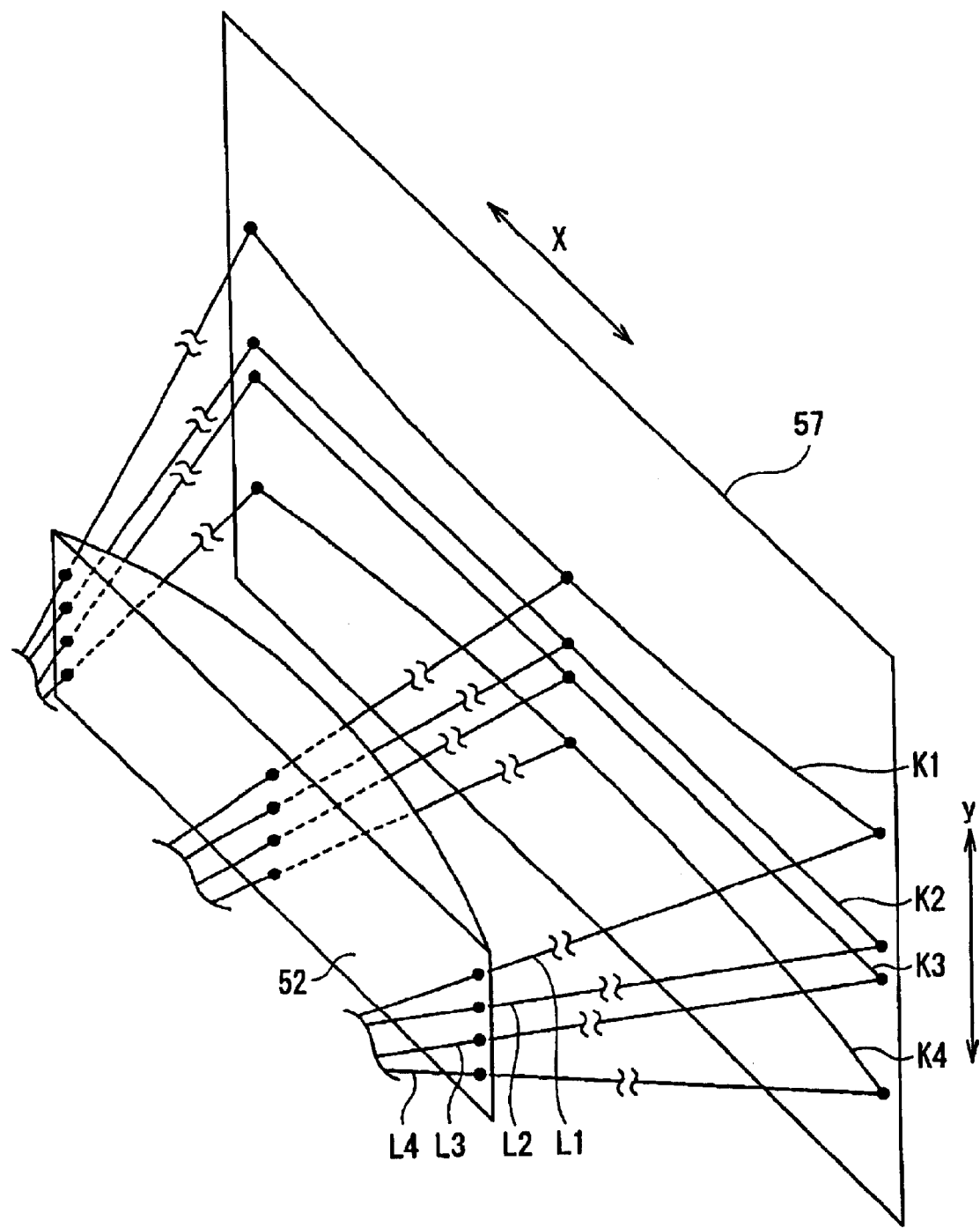
FIG. 12 shows a perspective view of a cylindrical lens of FIG. 2 with ray tracings to show how the cylindrical lens creates a curved line image.

The optical effects of the third optical system 5 will be described next with reference to FIGS. 6A–6B to 12. FIGS. 6A–6B, 7A–7B, and 8A–8B show enlarged side views in the same direction as FIG. 2 of three alternative embodiments of a rear portion of the optical system of the present invention, including the third optical system 5 in the plane including the second direction. FIGS. 6A–6B show side views where the lens parts 52A and 52B forming the second rear cylindrical lens 52 of the third optical system 5 are not inclined. FIGS. 7A–7B and 8A–8B show side views where the lens parts 52A and 52B are inclined by specified angles. Furthermore, FIGS. 6A, 7A, and 8A show the state before the scanning line curvature is corrected and FIGS. 6B, 7B, and 8B show the state after the scanning line curvature is corrected. In the figures, the light beams L1 and L2 and the scanning lines S1 and S2 produced by them on the scanned surface 7 are shown. In the figures, only elements relating to the top two light beams L1 and L2 are shown and elements relating to the bottom two light beams L3 and L4 are omitted. The figures also neglect the refraction the light beams undergo when they pass through the rear cylindrical lens. FIG. 9A shows a simplified enlarged view of the light incident surface of a lens part shown in FIG. 6A, specifically near the incident surface 53A of the second rear cylindrical lens 52. FIG. 9B shows a simplified enlarged view of a portion of the light incident surface of a lens part corresponding to light incidence surfaces shown in FIGS. 7A and 8A, specifically near the incident surface 53A of the second rear cylindrical lens 52.

FIGS. 6A and 9A show cases in which the light beams L1 and L2 from the reflecting surface 41 enter the first and second rear cylindrical lenses 51 and 52 with their spacings increasing. The first and second rear cylindrical lenses 51 and 52 do not have refractive power in the second direction. Therefore, the light beam L1 that enters them obliquely exits the cylindrical lenses parallel to its incident direction. The light beam L2 enters at a right angle, passes through, and exits the cylindrical lenses without being refracted. It is assumed that the angles of incidence in the second direction of the light beams L1 and L2 onto the surface 53A of the second cylindrical lens 52 at the center in the first direction are α1 and α2, respectively, as measured from the surface normal. In this example, α2=0.

The light beams L1 and L2 that pass through the second rear cylindrical lens 52 are twisted (so-called skewed beams) except for the components that pass through the second cylindrical lens at the center in the first direction. The degrees of twist vary depending on the incident points. Specifically, the components that pass through the second rear cylindrical lens 52 near the center in the first direction are less twisted and the components that pass through it near the periphery in the first direction are more twisted. In addition, the twist is more pronounced when the incident angle α1 in the second direction is larger in absolute value. The twisted light beams result in distorted spots on the scanned surface 7, which will be described later. In this example, distortion is not observed in the light spot of the light beam L2 because its incident angle α2 in the second direction is zero. Distortion is not observed in the light spot of the light beam L3, either, because its incident angle α3 in the second direction is zero. However, distortion is observed in the light spot of the light beam L4 because its incident angle α4 in the second direction is not zero.

In the example of FIG. 6A, of the resultant scanning lines S1 and S2 on the scanned surface, the scanning line S1 is raised in the middle and the scanning line S2 is straight, as will be described in detail later. On the other hand, in the examples of FIGS. 7A, 8A, and 9B, the first lens part 52A is inclined by an angle of θ and the second lens part 52B is inclined by an angle of −θ. The angle θ is larger in FIG. 8A than in FIG. 7A. The angle θ in FIG. 7A produces scanning lines S1 and S2 that are curved oppositely in direction but equal in magnitude. The increased angle θ in FIG. 8A produces the linear scanning line S1. The relationship between the inclination angle θ and the scanning line curvature will be described in detail later.

As shown in FIG. 9B, it is assumed that the angle of incidence in the incident plane including the second direction of the first and second light beams L1 and L2 (the angles between the light beams L1 and L2 and the normal line to the incident surface 53A of the first lens part 52A), are β1 and β2 respectively, when the first lens part 52A is inclined by an angle of θ. It is preferred that the first lens part 52A is inclined so that the absolute value total of the angle of incidence $|\beta1|+|\beta2|$ of the first and second light beams L1 and L2 is equal to the absolute value total of the angle of incidence $|\alpha1|+|\alpha2|$ when the first lens part 52A is not inclined (FIG. 6A). In other words, the inclination angle θ is preferably determined to satisfy the following condition:

$$|\beta1|+|\beta2|=|\alpha1|+|\alpha2| \qquad \text{Condition (1)}$$

Thus, the inclination angle θ should satisfy the following condition:

$$0 \leq |\theta| \leq |\alpha1| \qquad \text{Condition (2)}$$

Likewise, it is assumed that the angle of incidence in the incident plane including the second direction of the third and fourth light beams L3 and L4 (not shown in FIG. 9B), that is, the angles between the light beams L3 and L4 and the normal line to the incident surface 53B of the second lens part 52B, are β3 and β4, respectively, (not shown) when the second lens part 52B is inclined by an angle of −θ. It is preferred that the second lens part 52B is inclined so that the absolute value total of the angles of incidence $|\beta3|+|\beta4|$ of the third and fourth light beams L3 and L4 is equal to the absolute value total of the angles of incidence $|\alpha3|+|\alpha4|$ when the second lens part 52B is not inclined. In other words, the inclination angle −θ is preferably determined to satisfy the following condition:

$$|\beta3|+|\beta4|=|\alpha3|+|\alpha4| \qquad \text{Condition (3)}$$

Thus, the inclination angle −θ should satisfy the following condition:

$$0 \leq |-\theta| \leq |\alpha4| \qquad \text{Condition (4)}$$

With the first and second lens parts 52A and 52B inclined by the angles described above, the distortion in shape of the light spots formed by the light beams L1 and L2 on the scanned surface 7 is reduced. As described above, the light beams L2 and L3 produce light spots with no distortion, but the light beams L1 and L4 produce distorted light spots in the example shown in FIG. 6A. All the light beams L1 to L4 produce distorted light spots in the example shown in FIG. 7A, but to a lesser degree compared to the light beams L1 and L4 in FIG. 6A. The light beam L1 produces a light spot with much less distortion in the example shown in FIG. 8A.

FIGS. 10A–10F are intensity contour maps of different light spots at the scanned plane of scanned surface 7 with the optical system of FIG. 6A where the first lens part 52A is inclined by 0°. FIGS. 11A–11F are intensity contour maps of different light spots at the scanned plane of scanned surface 7 with the optical system of FIG. 7A where the first lens part 52A is inclined by 1.0°. FIGS. 10A to 10C and FIGS. 11A to 11C show the case in which the incident angle is 0.0°. FIGS. 10D to 10F and FIGS. 11D to 11F show the case in which the incident angle is 1.5°. FIGS. 10B and 10E and FIGS. 11B and 11E represent the light intensities in contour within the light spots produced by the light beams that pass through the second cylindrical lens 52 at the center in the first direction. FIGS. 10A, 10C, 10D, and 10F and FIGS. 11A, 11C, 11D, and 11F represent the light intensities in contour within the light spots produced by the light beam that pass through the second cylindrical lens 52 at either periphery in the first direction.

Figure 10C:
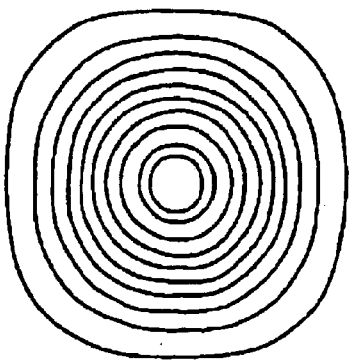
FIGS. 10A–10F are intensity contour maps of different light spots at the scanned plane using the optical system of FIG. 6A.
Figure 10F:
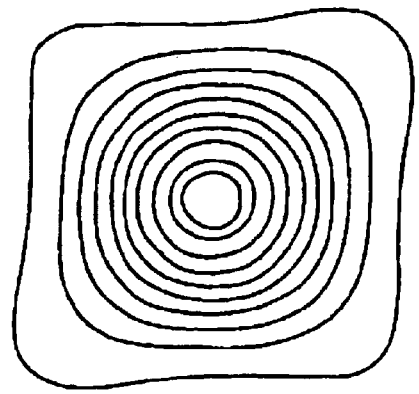
Figure 10B:
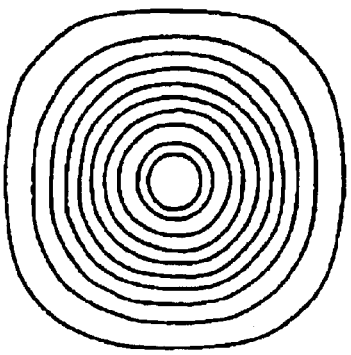
Figure 10E:
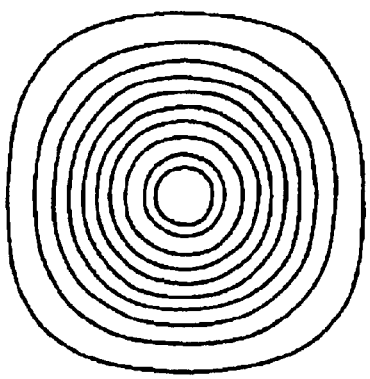
Figure 10A:
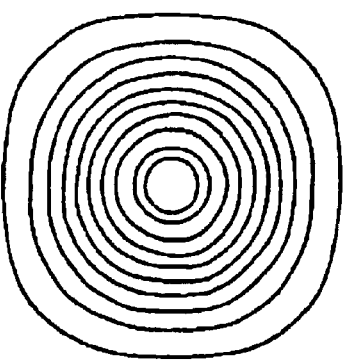
Figure 10D:
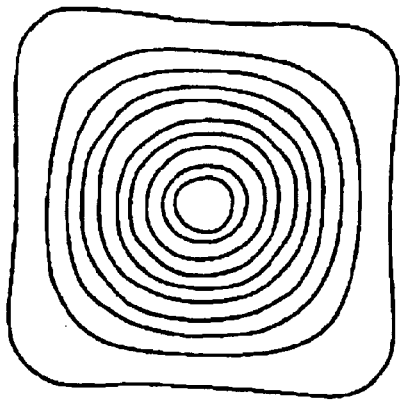

When the first lens part 52A is not inclined, as shown in FIG. 10A, the light intensities in contour within the light spot produced by the light beam that passes through the second cylindrical lens 52 at the center in the first direction show no differences between the incident angels of 0.0° (FIG. 10B) and 1.5° (FIG. 10E). No distortions are observed. However, the cross-section is larger for an angle of incidence of 1.5° than at an angle of incidence of 0.0°. On the other hand, the light intensities in contour within the light spots produced by the light beams that pass through either periphery demonstrate more distortion with the incident angle of 1.5° (FIGS. 10D and 10F) than with the incident angle of 0.0° (FIGS. 10A and 10C).

Figure 11C:
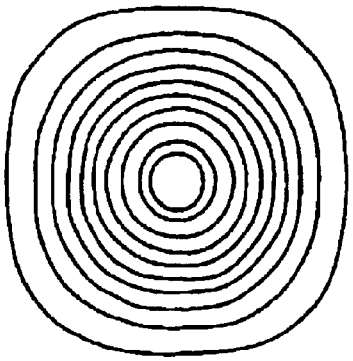
FIGS. 11A–11F are intensity contour maps of different light spots at the scanned plane corresponding to the optical systems shown in FIGS. 7A–7B and 8A–8B.
Figure 11F:
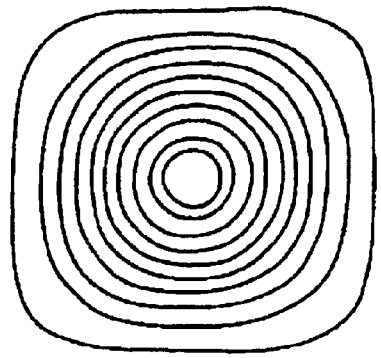
Figure 11B:
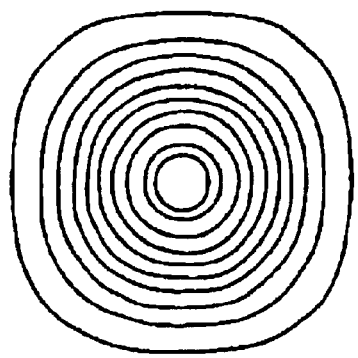
Figure 11E:
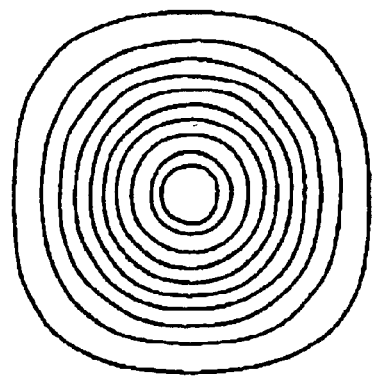
Figure 11A:
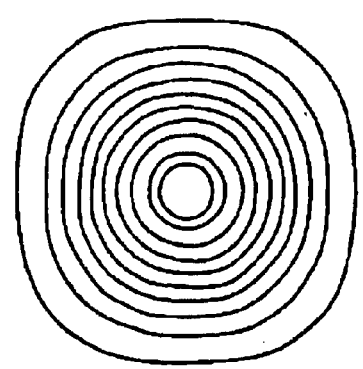
Figure 11D:
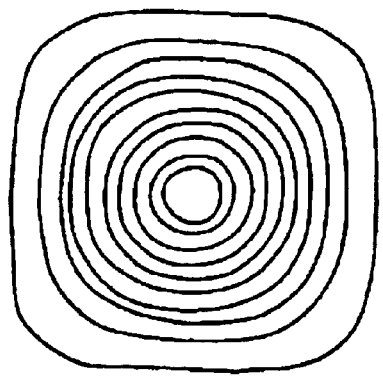

When the first lens part 52A is inclined by 1.0°, as shown in FIGS. 11A to 11F, the light intensities in contour within the light spot produced by the light beams that pass through the second cylindrical lens 52 at either periphery in the first direction demonstrate less distortion compared with those in FIGS. 10A to 10F. The light intensities in contour within the light spots are less distorted in FIGS. 11D and 11F compared with those in FIGS. 10D and 10F. The light intensities in contour within the light spots produced by the light beams that pass through the second cylindrical lens 52 at the center in the first direction show no differences between the angle of incidence 0.0° (FIG. 11B) and 1.5° (FIG. 11E). No distortions are observed.

According to the results described above, it is understood that with the first lens part 52A of the second cylindrical lens 52 being inclined, the light spot on the scanned surface 7, particularly the light spot produced by light beams that passes through the rear second cylindrical lens 52 at either periphery, are significantly improved in shape. Likewise, with the second lens part 52B being inclined, the light spot produced by the light beams L3 and L4 on the scanned surface 7, particularly the light spots produced by light beams that pass through the second cylindrical lens 52 at either periphery, are significantly improved in shape.

Figure 13:
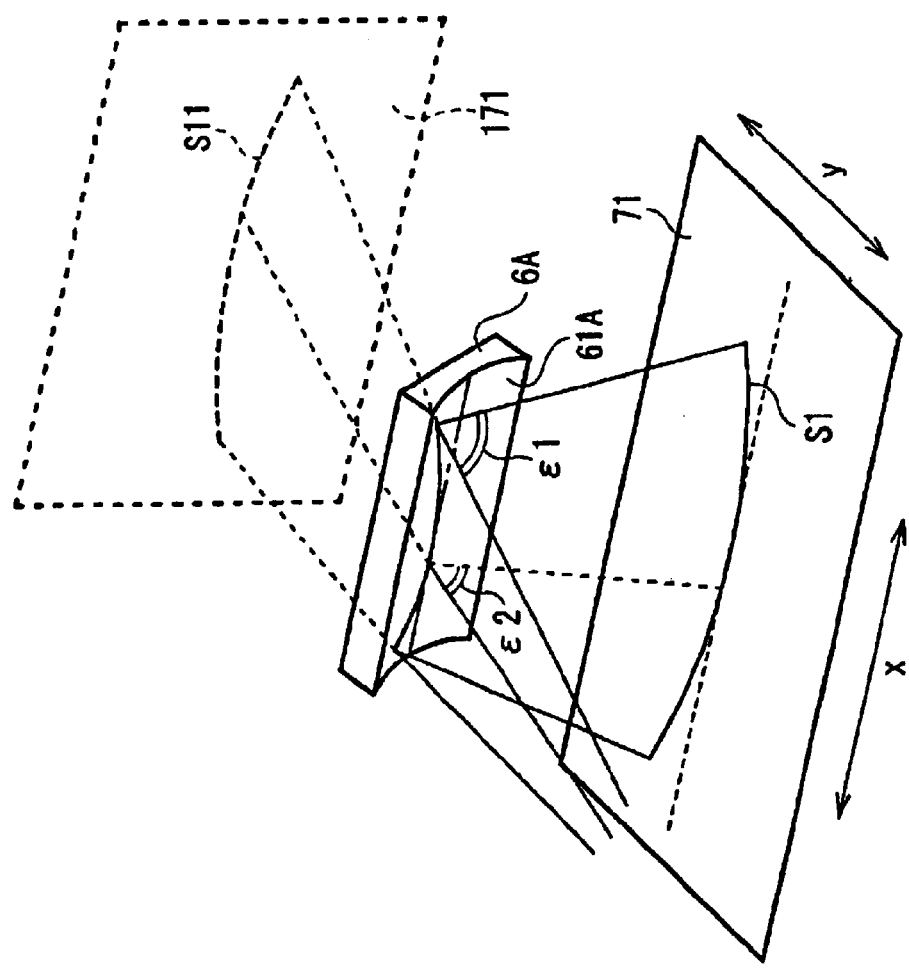
FIG. 13 shows a perspective view of a cylindrical mirror of FIG. 2 with ray tracings to show how the cylindrical mirror creates a curved line image.

The scanning line curvatures that occur mainly when the light beams pass through the third optical system 5 and correction thereof are described below. How the scanning line curvatures occur will be described with reference to FIGS. 6A, 6B, 8A, 8B, 12, and 13. FIGS. 12 and 13 are perspective views with ray tracings that show how the scanning line curvatures occur on the scanned surfaces 71 to 74 after the light beams L1 to L4 pass through the second rear cylindrical lens 52 and are reflected by the cylindrical mirrors 6A to 6D that form a fourth optical system 6 in the example of FIG. 6A. The first rear cylindrical lens 51, separation optical system 9, and cover glasses 10A to 10D are omitted in FIGS. 12 and 13.

First, the scanning line curvatures that occur when the light beams L1 to L4 pass through the second cylindrical lens 52 will be described with reference to FIG. 12. FIG. 12 shows the scanning line curvatures on an imaginary surface 57 that occurs immediately after the light beams L1 to L4 pass through the second rear cylindrical lens 52. The light beams L2 and L3 enter the second cylindrical lens 52 with their spacings in the plane including the second direction being maintained constant. The light beams L1 and L4 enter the second cylindrical lens 52 with their spacings in the plane including the second direction being increased. Thus, the light beams L2 and L3 proceed parallel to the center optical axis 55 (FIG. 6A) of the third optical system 5 in the plane including the second direction and enter the second rear cylindrical lens 52 at a right angle in this plane. The light beams L1 and L4 are not parallel to the center optical axis 55 of the third optical system 5 in the plane including the second direction and do not enter the second cylindrical lens 52 at a right angle in this plane. In other words, the light beams L1 and L4 always enter the second cylindrical lens 52 obliquely. The incident points of the light beams L1 to L4 (the points at which the light beams enter the second rear cylindrical lens 52) vary not only in the direction along the center optical axis 55, but also in height (in the second direction), depending on where the light beams L1 and L4 pass through in the second rear cylindrical lens 52, at the center or at the periphery in the first direction.

Of the top two light beams L1 and L2, the light beam L1 enters the second rear cylindrical lens 52 at a higher point at the periphery than at the center in the first direction. As a result, the scanning line produced by the light beam L1 on the imaginary surface 57 is lower in the center, which is the scanning line K1 shown in FIG. 12. On the other hand, the light beam L2 enters the first and second rear cylindrical lenses 51 and 52 at a right angle and at the same height both at the periphery and at the center in the first direction. As a result, the scanning line produced by the light beam L2 on the imaginary surface 57 is straight, which is the scanning line K2 shown in FIG. 12.

The scanning line curvature that occurs when the light beams L1 to L4 pass through the second rear cylindrical lens 52 and separation optical system 9 and are reflected by the cylindrical mirrors 6A to 6D before they reach the scanning surface 7 is described with reference to FIGS. 6A, 6B and 13. FIG. 13 shows a light beam and a cylindrical mirror 6A that reflects it.

As shown in FIG. 13, the light beam L1 is incident onto the cylindrical mirror 6A at higher points on either side in the scanning direction (the first direction) than at its center. The cylindrical mirror 6A is inclined in the plane including the second direction in relation to the light beam. The light beam has an incident angle of ($\epsilon 1$)/2 on either side so that the light beam is deflected upon reflection from the mirror by an angle $\epsilon 1$, which is larger than the total deflection angle $\epsilon 2$ of rays reflected from the mirror at its center. The reflected light beam produces the scanning line S1 that is raised in the center on the scanned surface 71. The dotted lines in the drawing are for purposes of easier understanding; thus, the scanning line S11 is illustrated as produced on a scanned surface 171 that corresponds to the scanned surface 71. The scanning line S11 has the opposite curve to the scanning line K1 produced immediately after the second cylindrical lens 52. Accordingly, the scanning line S1 on the scanned surface 71 has the opposite curve to the scanning line K1 produced immediately after the second cylindrical lens 52. Conversely, the light beam L2 produces no curvature after passing through the second cylindrical lens 52 and, therefore, no curvature after being reflected by the cylindrical mirror 6B. This is because the light flux L2 enters the cylindrical mirror 6B at the same height both at the center and periphery. The same analysis applies to the bottom two light beams L3 and L4, which have a relationship symmetric to that of the light beams L1 and L2 in relation to the center optical axis 55.

Of the light beams L1 and L2 that pass through the second cylindrical lens 52 and are reflected by the cylindrical mirrors 6A, 6B, light beam L1 eventually produces the scanning line S1 that is curved in the second direction on the scanned surface 7 as shown in FIG. 6A. The other light beam L2 produces the straight scanning line S2 on the scanned surface 7. Likewise, of the bottom two light beams L3 and L4, light beam L3 produces a straight scanning line on the scanned surface 7 and the other light beam L4 produces s scanning line oppositely curved to the scanning line S1.

FIGS. 14A to 14C and FIGS. 15A and 15B show variations in curvature of the scanning lines on the imaginary surface 57 immediately after the first lens part 52A in accordance with inclination angles of the first lens part 52A that includes incident surface 53A of the second rear cylindrical lens 52. For a simplified explanation, the angles of incidence $\alpha 1$ and $\alpha 2$ of FIG. 9A are shown as $\beta 1$ and $\beta 2$ in FIG. 14A, with values of "2a" and "0", respectively.

Figure 14A:
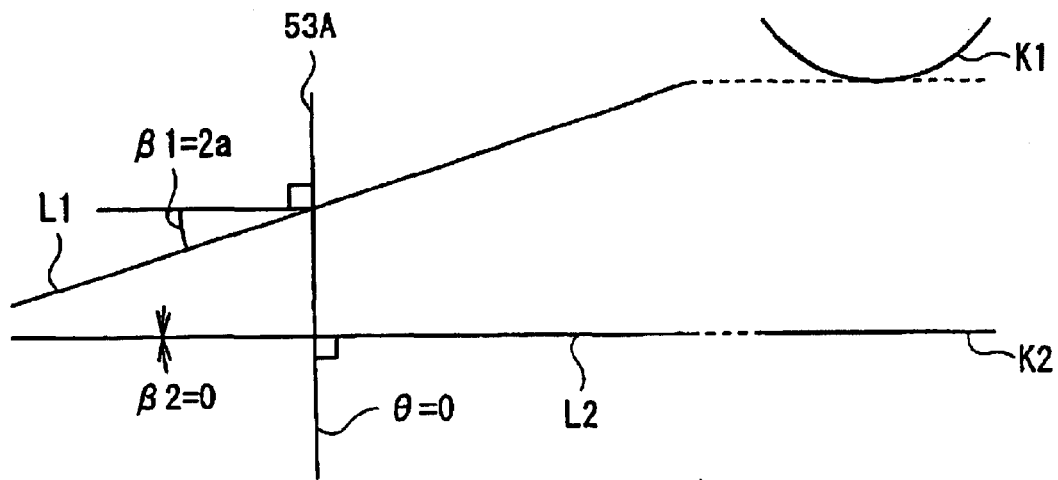
FIGS. 14A–14C show simplified enlarged cross-sectional views of the light incident surface of the cylindrical lens of FIG. 12, but with the cylindrical lens inclined at different angles.

FIG. 14A shows the case in which the first lens part 52A is not inclined, or the inclination angle $\theta$ of the first lens part 52A is zero. In this case, the incident angle $\beta 1$ of the light beam L1 to the incident surface 53A of the first lens part 52A is "2a" and the incident angle $\beta 2$ of the light beam L2 is zero. The light beam L2 enters at a right angle in the plane including the second direction and the scanning line K2 is subject to no curvature. Hence, there is no need to correct the curvature using a cover glass. The light beam L1 produces the curved scanning line K1. Therefore, there is a need to correct the curvature using a cover glass.

Figure 14B:
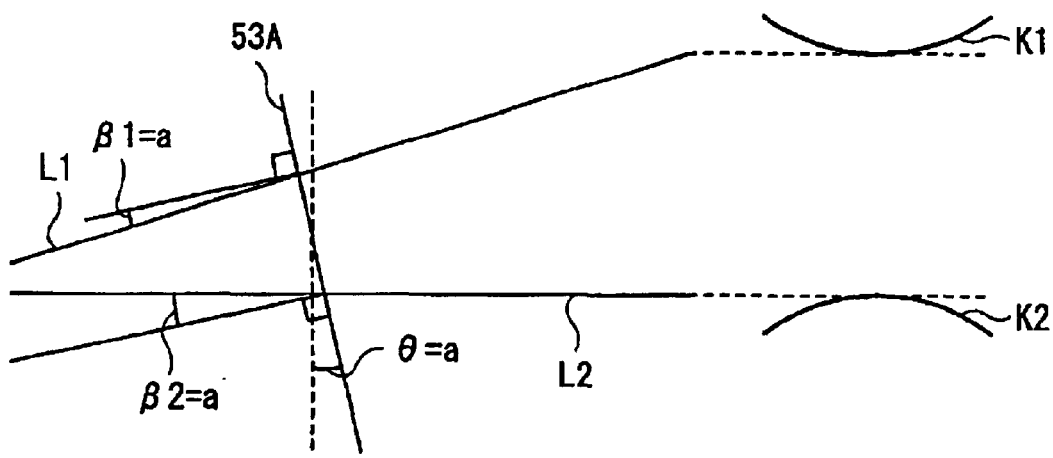

FIG. 14B shows the case in which the inclination angle $\theta$ of the first lens part 52A is "a". In this case, both the angles of incidence of the light beams L1 and L2 to the incident surface 53A of the first lens part 52A are "a". Both of the light beams L1 and L2 produce curved scanning lines, K1 and K2. However, their curvature is much smaller than the scanning line K1 with the incident angle $\beta 1$ equal to "2a" as shown in FIG. 14A. The scanning lines K1 and K2 have curvatures in opposite directions.

Figure 15A:
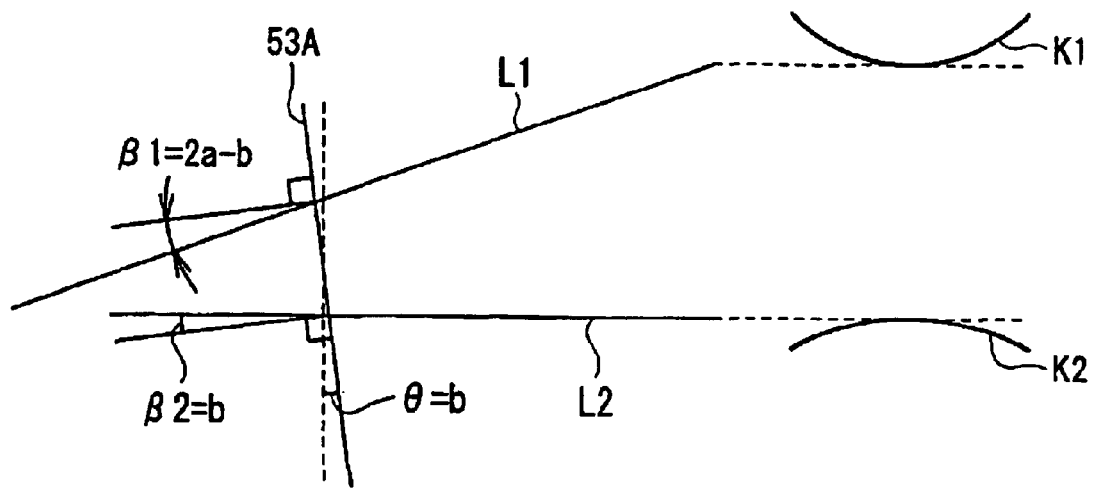
FIGS. 15A–15B show simplified enlarged cross-sectional views of the light incident surface of the cylindrical lens of FIG. 12, but with the cylindrical lens inclined at angles different from those of FIGS. 14A–14C.

As shown in FIG. 15A, when the inclination angle $\theta$ is "b," which is slightly smaller than "a", the scanning lines K1 and K2 have curvatures in opposite directions but nearly equal in magnitude. Therefore, this moderates the correction factors for curvature required by the cover glasses 10A and 10B, to be described later, compared with the scanning line K1 in FIG. 14A. Additionally, the correction factors being equal in absolute value facilitates the correction.

Figure 14C:
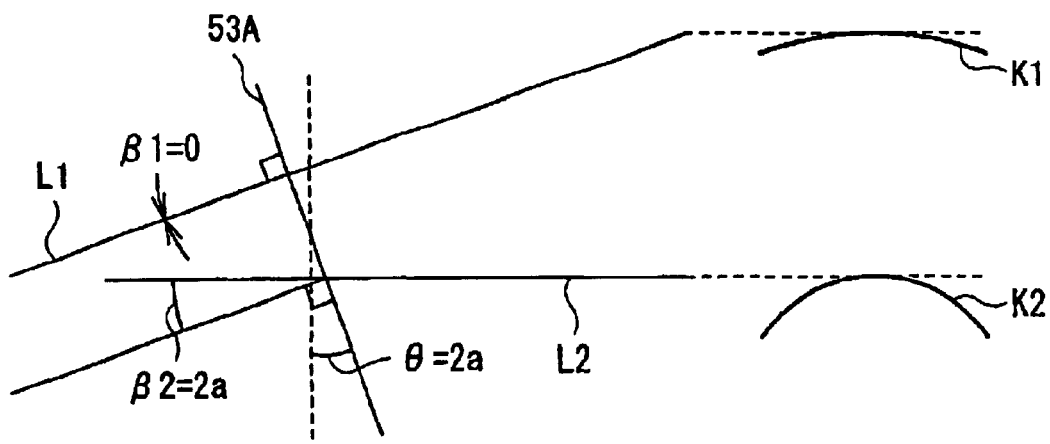

FIG. 14C shows the case in which the inclination angle $\theta$ of the first lens part 52A is "2a". In this case, the incident angle $\beta 2$ of the light beam L2 to the incident surface 53A of the first lens part 52A is "2a" and the incident angle $\beta 1$ of the light beam L1 is zero. The light beam L1 enters at a right angle in the plane including the second direction. The scanning line K1 is subject to the curvature that occurs when the light beam L1 pass through the first cylindrical lens 51 obliquely.

Figure 15B:
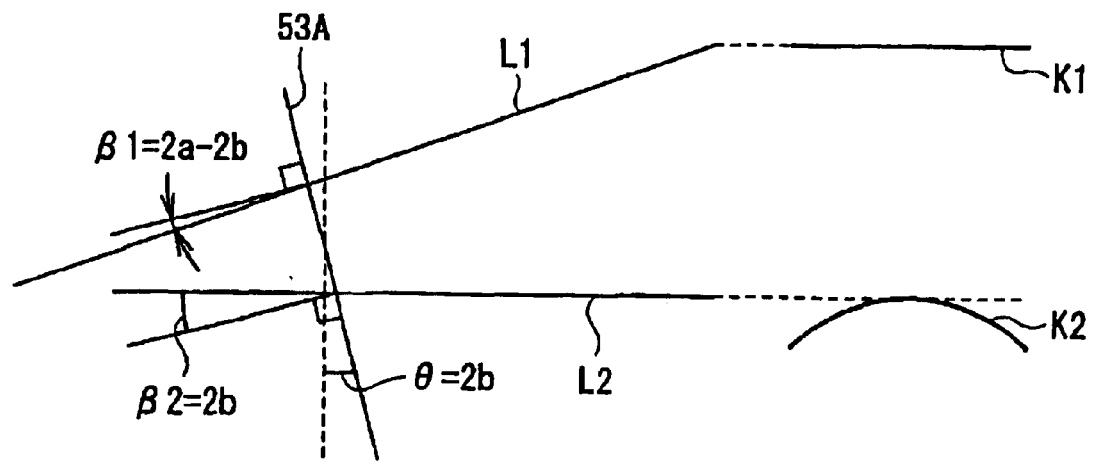

FIG. 15B shows the case in which the inclination angle $\theta$ of the first lens part 52A is "2b". As shown in FIG. 15B, with the inclination angle "2b" that is slightly smaller than the inclination angle "2a" (however, a<2b), the first rear cylindrical lens 51 and the second rear cylindrical lens 52 produce scanning line curvatures equal in magnitude but opposite in direction so that they cancel each other, preventing the curvature of the scanning line K1. This eliminates the need for curvature correction for the light beam L1 by a cover glass. The light beam L2 produces the curved scanning line K2, requiring curvature correction by a cover glass, which will be described later. However, its curvature is smaller than the scanning line K2 with the first lens part 52A being inclined by "2a", as shown in FIG. 14C with the incident angle $\beta 1$ equal to zero, and is nearly equal in magnitude, but opposite in direction, to the scanning line K1 with the first lens part 52A being not inclined, as shown in FIG. 14A with the incident angle β1 equal to "2a".

The above description concerning FIGS. 14A, 14C, and FIG. 15B may be generalized as follows. The inclination angle θ of the first lens part 52A is determined so that the scanning line curvature caused by the second rear cylindrical lens 52 that depends on the incident angle β1 or β2 on the incident surface in the second direction of one of the light beams L1 and L2 is equal in magnitude but opposite in direction to the scanning line curvature caused by the first rear cylindrical lens 51. This similarly applies to the light beams L3 and L4. This makes one of the scanning lines of the light beams L1 and L2 (i.e., K1 or K2) and one of the scanning lines of the light beams L3 and L4 (i.e., K3 or K4) straight. Then, a further correction for curvature is necessary only for the remaining nonlinear scanning lines, and in fact may make further correction of scanning lines for curvature in the optical system following the second rear cylindrical lens 52 unnecessary.

Figure 16A:
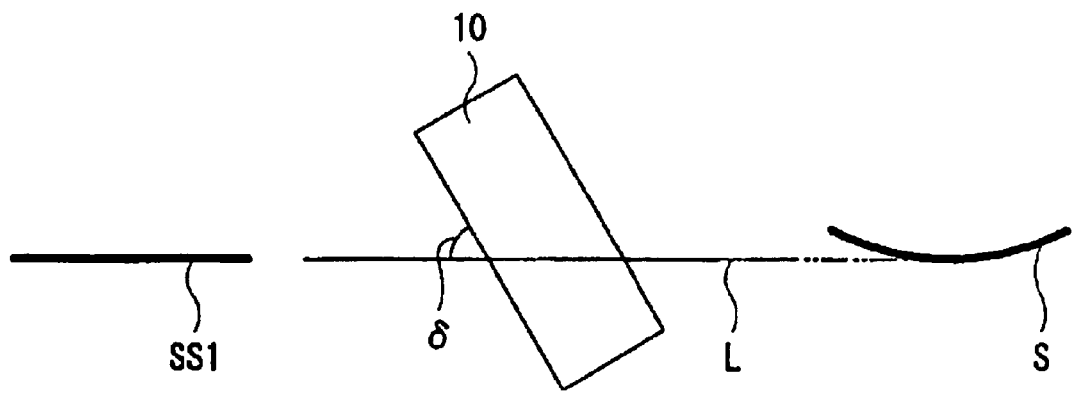
FIGS. 16A–16C show cross-sectional views of a cover glass at various inclinations for changing the curvature of a scanning line.
Figure 16B:
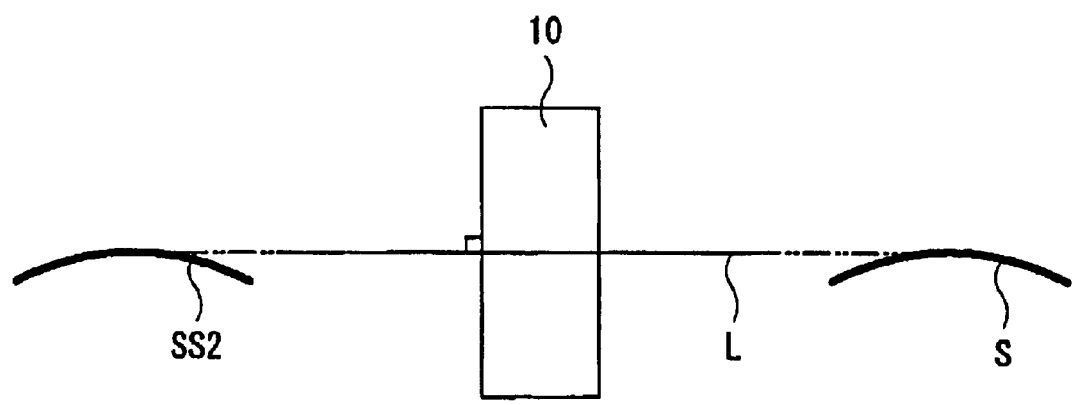
Figure 16C:
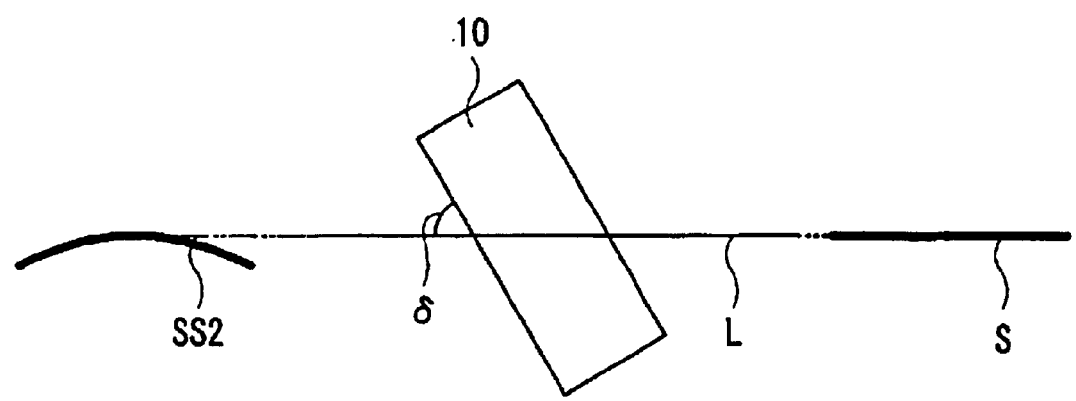

FIGS. 16A–16C show cross-sectional views of a cover glass at various inclination angles for changing the curvature of a scanning line that illustrate the principle of correcting the scanning line curvature caused by the second rear cylindrical lens 52 using cover glasses. The cover glass 10 represents the cover glasses 10A to 10D, the light beam L represents light beams L1 to L4, and the scanning line S represents the scanning lines S1 to S4.

In FIG. 16A, it is assumed that light beam L produces a straight scanning line SS1 after being reflected by a cylindrical mirror (not shown). In this case, after passing through the cover glass 10 inclined by an angle δ, measured as illustrated, the light beam L produces a scanning line S on the scanned surface that is curved depending on the inclination angle δ and its direction.

In FIG. 16B, it is assumed that light beam L produces a curved scanning line SS2 after being reflected by a cylindrical mirror (not shown). In this case, after passing through the cover glass 10 provided orthogonal to the beam, the light beam L produces a curved scanning line S on the scanned surface (i.e., the curvature of the scanning line SS2 is maintained).

In FIG. 16C, it is assumed that the light beam L produces a curved scanning line SS2 after being reflected by a cylindrical mirror (not shown). In this case, after passing through the cover glass 10 inclined by an angle δ, measured as illustrated to the beam, the light beam L produces a substantially straight scanning line S. Thus, the curvature of the scanning line SS2 before the cover glass 10 is canceled by the opposite curvature caused by the cover glass 10, resulting in the scanning line S on the scanned surface being substantially straight.

The principle discussed above is adapted to correct the curvature of the scanning lines on the scanned surface 7. As shown in FIGS. 6B, 7B, and 8B, the cover glasses 10A and 10B are provided in the optical paths of the light beams L1 and L2 and inclined so that curvatures introduced in the scanning lines of the light beams L1 and L2 are corrected. The curvatures introduced in the scanning lines of the light beams L1 and L2 are canceled by the cover glasses 10A and 10B so that straight scanning lines S1 and S2 can be obtained on the scanned surface 7.

As described above, of the light beams L1 to L4 from the reflecting surface 41, the light beams L2 and L3 travel in parallel to each other in the plane including the second direction and enter the rear optical system PST, and the light beams L1 and L4 intersect each other in the plane including the second direction and enter the rear optical system at angles that allow them to progressively separate from each other. This can reduce the minimum width 41D in the second direction of the reflecting surface 41. Thus, the polygon mirror 4 can be reduced in thickness in the second direction, facilitating weight reduction. This enables high speed rotation of the polygon mirror, leading to higher printing speeds.

In the disclosed embodiments of the present invention, when the second cylindrical lens 52 includes first and second lens parts adjacent to each other in the second direction and the first and second lens parts 52A and 52B are each inclined by zero degrees, as shown in FIG. 9A, curvature correction is required only for the light beam L1 and not for the light beam L2. Thus, there is no need to divide the second cylindrical lens 52 into the first and second lens parts 52A and 52B. This eliminates additional processes and facilitates the production of the second rear cylindrical lens 52.

In the disclosed embodiments of the present invention, when the second rear cylindrical lens 52 includes first and second lens parts 52A and 52B adjacent to each other in the second direction and the first lens part 52A is inclined by an angle of θ and the second lens part 52B is inclined by an angle of −θ, as shown in FIG. 9B, the problem that occurs when the light beams enter the second cylindrical lens 52 at larger angles can be mitigated. In particular, the light beams are subject to the least distortion in cross-section when the first lens part 52A is inclined so that the absolute value total of the angles of incidence of the first and second light beams L1 and L2 is not changed and the second lens part 52B is inclined so that the absolute value total of the angle of incidence of the third and fourth light beams L3 and L4 is not changed. This can prevent distortion in shape of the light spots on the scanned surface 7.

In the disclosed embodiments of the present invention, the scanning line S1 of the light beam L1 can be straight when the inclination θ of the first lens part 52A is determined so that scanning line curvature caused by the second rear cylindrical lens 52 depending on the incident angle β1 in the incident surface including the second direction of one of the light beams L1 and L2 is equal in magnitude but opposite in direction to the scanning line curvature caused by the first rear cylindrical lens 51. The same analysis applies to the second lens part 52B and the light beam L4. In this case, correction for curvature is unnecessary for the light beams L1 and L4 although it is necessary for the light beams L2 and L3 that otherwise produce curved scanning lines. This curvature correction technique is preferred when curvature correction is difficult for the light beams L1 and L4, for example, for reasons of mechanical design.

In the disclosed embodiments of the present invention, cover glasses 10A and 10B may be provided in the optical paths of the light beams L1 and L2. The cover glasses 10A and 10B are inclined in the direction in which they cancel the potential curvatures of the light beams L1 and L2. The potential curvatures of the light beams L1 and L2 are canceled by the cover glasses 10A and 10B so that straight scanning lines S1 and S2 are obtained on the scanned surface 7. The same is true for the light beams L3 and L4. Thus, all the scanning lines on the scanned surface 7 are straight, providing high quality latent images without distortion.

The present invention has been described as set forth above. However, the present invention is not confined to these descriptions and various modifications can be made. For example, although the light source is described above as providing four light beams, the light source may provide five or more light beams. Additionally, the second optical system 3 includes four cylindrical lenses 31 to 34 having positive power in the second direction. However, the second optical system 3 is not confined to this construction and can have refractive power in the first direction.

Furthermore, as described above, the third optical system 5 includes a first cylindrical lens 51 having negative refractive power in the first direction and a second cylindrical lens 52 having positive refractive power in the first direction. However, the third optical system 5 is not limited to this construction. For example, it can have a refractive power in the second direction. When the second cylindrical lens 52 consists of two, first and second, lens parts 52A and 52B, the two lens parts can be separate lens parts, which are provided individually. Alternatively, the two can be integrated into one piece as the second cylindrical lens 52. In particular, it may preferably be one piece when not inclined. When the first and second lens parts 52A and 52B are separately provided, their inclinations can be adjusted independently.

In the optical scanning device of the present invention, as shown in FIG. 3, the light beams L1 and L4 intersect between the second optical system 3 and the reflecting surface 41 of the polygon mirror 4. However, this is not restrictive. The following modifications shown in FIG. 5 can be made to obtain the same effect.

FIG. 5A shows a first modification (hereafter termed Modification 1) of the optical scanning device of the present invention. In Modification 1, the light beams L1 and L4 intersect before the second optical system 3. In this case, the light beam L1 intersects the light beam L2 with an angle of γ1 and the light beam L4 intersects the light beam L3 with an angle of γ2 immediately after they exit from the second optical system 3. The light beams L1 and L4 proceed with their spacings gradually increasing and enter the first rear cylindrical lens 51 with their spacings further increased after being reflected by the reflecting surface 41.

In Modification 1, sufficient spacings between the light beams L1 and L2 and between the light beams L3 and L4 are ensured at the separation point of the rear optical system PST compared to the embodiment previously described above. However, the spacings between the light beams L1 and L2 and between the light beams L3 and L4 on the reflecting surface 41 of the polygon mirror 4 are larger than those of the embodiment previously described above. In Modification 1, the angles γ1 and γ2 or the optical path length between the second optical system 3 and reflecting surface 41 can be reduced in order to reduce the minimum width 41D in the second direction of the reflecting surface 41.

FIG. 5B shows a second modification (hereafter termed Modification 2) of the optical scanning device of the present invention. In Modification 2, the light beams L1 and L4 intersect after the polygon mirror 4. In this case, the minimum width 41D in the second direction of the reflecting surface 41 of the polygon mirror 4 can be smaller than that of the embodiment previously described above. However, sufficient spacings between the light beams L1 and L2 and between the light beams L3 and L4 are not ensured at the separation point of the rear optical system PST, making the separation difficult. In Modification 2, the optical path length between the reflecting surface 41 and separation optical system 9 can be increased in order to ensure the separate spacings between the light beams L1 and L2 and between the light beams L3 and L4 at the separation point of the rear optical system PST. The incident angle to the second optical system 3 can be increased. However, this is not preferable because it tends to increase aberrations.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An optical scanning device for scanning a plurality of light beams on one or more scanned surfaces, the optical scanning device comprising:
   a light source for emitting said plurality of light beams;
   a front optical system for receiving said plurality of light beams from the light source along an optical axis that extends within the optical scanning device;
   a deflector for receiving said plurality of light beams from said front optical system and for deflecting said plurality of light beams in a first direction so that said plurality of light beams scan in said first direction;
   a rear optical system for receiving said plurality of light beams from said deflector and for directing said plurality of light beams toward the one or more scanned surfaces so that said plurality of light beams are separated farther in a second direction that is orthogonal to said first direction within said rear optical system than at said deflector;
   wherein
   two light beams of said plurality of light beams are deflected by said deflector, and said two light beams travel parallel to one another in a plane that includes said second direction before said two light beams enter said rear optical system; and
   other light beams of said plurality of light beams are deflected by said deflector and said other light beams progressively separate from one another in said plane before said other light beams enter said rear optical system.

2. The optical scanning device of claim 1, wherein:
   said front optical system includes, in order from the light source side, a first optical system for collimating each of said plurality of light beams and a second optical system for converging each of said plurality of light beams at least in said second direction.

3. The optical scanning device of claim 1, wherein:
   said rear optical system includes, in order from the light source side, a third optical system for converging in said first direction each of said plurality of light beams deflected from said deflector, a separation optical system for separating said plurality of light beams in said second direction after they pass through said third optical system, and a fourth optical system for converging each of said plurality of light beams at least in the second direction after they pass through said separation optical system.

4. The optical scanning device of claim 2, wherein:
   said rear optical system includes, in order from the light source side, a third optical system for converging in said first direction each of said plurality of light beams deflected from said deflector, a separation optical system for separating said plurality of light beams in said second direction after they pass through said third optical system, and a fourth optical system for converging each of said plurality of light beams at least in the second direction after they pass through said separation optical system.

5. The optical scanning device of claim 4, wherein said third optical system includes at least one cylindrical lens having refractive power at least in said first direction.

6. The optical scanning device of claim 5, wherein said at least one cylindrical lens includes, in order from the light source side, a first cylindrical lens having negative refractive power in said first direction and a second cylindrical lens having positive refractive power in said first direction.

7. The optical scanning device of claim 6, wherein said other light beams intersect in said plane between said second optical system and said deflector.

8. The optical scanning device of claim 7, wherein said other light beams enter said rear optical system at positions in said plane that are outside said two light beams.

9. The optical scanning device of claim 8, wherein:
said deflector includes plural reflecting surfaces that deflect said plurality of light beams; and
said two light beams are reflected by said plural reflecting surfaces at right angles in said plane and enter said third optical system at right angles in said plane.

10. The optical scanning device of claim 8, wherein:
said plurality of light beams includes, in order in said second direction, first, second, third, and fourth light beams that are deflected by said deflector so that said second and third light beams are parallel in said plane;
said second cylindrical lens includes first and second lens parts that are adjacent to one another in said second direction;
the first lens part includes a first light incident surface that is inclined at an angle in said plane so that the sum of the absolute values of the angles that the first and second light beams make with said first light incident surface is equal to the sum of the absolute values of the angles that the first and second light beams would make with said first light incident surface if said first light incident surface were perpendicular to the center optical axis of said third optical system; and
the second lens part includes a second light incident surface that is inclined at an angle in said plane so that the sum of the absolute values of the angles that the third and fourth light beams make with said second light incident surface is equal to the sum of the absolute values of the angles that the third and fourth light beams would make with said second light incident surface if said second light incident surface were perpendicular to the center optical axis of said third optical system.

11. The optical scanning device of claim 8, wherein:
said plurality of light beams includes, in order in said second direction, first, second, third, and fourth light beams that are deflected by said deflector so that said second and third light beams are parallel in said plane;
said second cylindrical lens includes first and second lens parts that are adjacent to one another in said second direction;
the first lens part includes a first light incident surface that is inclined at an angle in said plane so that the first light beam produces a straight scanning line; and
the second lens part includes a second light incident surface that is inclined at an angle in said plane so that the fourth light beam produces a straight scanning line.

12. The optical scanning device of claim 4, wherein said fourth optical system includes a cylindrical mirror that has refractive power at least in said second direction.

13. The optical scanning device of claim 5, wherein said fourth optical system includes a cylindrical mirror that has refractive power at least in said second direction.

14. The optical scanning device of claim 6, wherein said fourth optical system includes a cylindrical mirror that has refractive power at least in said second direction.

15. The optical scanning device of claim 1, and further including a plurality of scanned surfaces wherein each scanned surface is on a different one of a plurality of photosensitive drums, and each of said plurality of light beams scans one of said plurality of scanned surfaces.

16. The optical scanning device of claim 2, and further including a plurality of scanned surfaces wherein each scanned surface is on a different one of a plurality of photosensitive drums, and each of said plurality of light beams scans one of said plurality of scanned surfaces.

17. The optical scanning device of claim 4, and further including a plurality of scanned surfaces wherein each scanned surface is on a different one of a plurality of photosensitive drums, and each of said plurality of light beams scans one of said plurality of scanned surfaces.

18. The optical scanning device of claim 5, and further including a plurality of scanned surfaces wherein each scanned surface is on a different one of a plurality of photosensitive drums, and each of said plurality of light beams scans one of said plurality of scanned surfaces.

19. The optical scanning device of claim 6, and further including a plurality of scanned surfaces wherein each scanned surface is on a different one of a plurality of photosensitive drums, and each of said plurality of light beams scans one of said plurality of scanned surfaces.

20. The optical scanning device of claim 7, and further including a plurality of scanned surfaces wherein each scanned surface is on a different one of a plurality of photosensitive drums, and each of said plurality of light beams scans one of said plurality of scanned surfaces.

21. An optical scanning device for scanning a plurality of light beams on one or more scanned surfaces, the optical scanning device comprising:
a light source for emitting said plurality of light beams;
a front optical system for receiving said plurality of light beams from the light source along an optical axis that extends within the optical scanning device;
a deflector for receiving said plurality of light beams from said front optical system and for deflecting said plurality of light beams in a first direction so that said plurality of light beams scan in said first direction;
a rear optical system for receiving said plurality of light beams from said deflector and for directing said plurality of light beams toward the one or more scanned surfaces so that said plurality of light beams are separated farther in a second direction that is orthogonal to said first direction within said rear optical system than at said deflector;
wherein
two light beams of said plurality of light beams are deflected by said deflector so that said two light beams travel parallel to one another in a plane that includes said second direction between said deflector and said rear optical system;
other light beams of said plurality of light beams that are deflected by said deflector enter said rear optical system so that other light beams progressively separate from one another in said plane;
said front optical system includes, in order from the light source side, a first optical system for collimating each of said plurality of light beams and a second optical system for converging each of said plurality of light beams at least in said second direction;
said rear optical system includes, in order from the light source side, a third optical system for converging in said first direction each of said plurality of light beams deflected from said deflector, a separation optical system for separating said plurality of light beams in said second direction after they pass through said third optical system, and a fourth optical system for converging each of said plurality of light beams at least in the second direction after they pass through said separation optical system;

said third optical system includes at least one cylindrical lens having refractive power at least in said first direction;

said at least one cylindrical lens includes, in order from the light source side, a first cylindrical lens having negative refractive power in said first direction and a second cylindrical lens having positive refractive power in said first direction; and said other light beams intersect in said plane between said second optical system and said deflector.

22. The optical scanning device of claim 21, wherein said other light beams enter said rear optical system at positions in said plane that are outside said two light beams.

23. The optical scanning device of claim 22, wherein:

said deflector includes plural reflecting surfaces that deflect said plurality of light beams; and said two light beams are reflected by said plural reflecting surfaces at right angles in said plane and enter said third optical system at right angles in said plane.

24. The optical scanning device of claim 22, wherein:

said plurality of light beams includes, in order in said second direction, first, second, third, and fourth light beams that are deflected by said deflector so that said second and third light beams are parallel in said plane;

said second cylindrical lens includes first and second lens parts that are adjacent to one another in said second direction;

the first lens part includes a first light incident surface that is inclined at an angle in said plane so that the sum of the absolute values of the angles that the first and second light beams make with said first light incident surface is equal to the sum of the absolute values of the angles that the first and second light beams would make with said first light incident surface if said first light incident surface were perpendicular to the center optical axis of said third optical system; and the second lens part includes a second light incident surface that is inclined at an angle in said plane so that the sum of the absolute values of the angles that the third and fourth light beams make with said second light incident surface is equal to the sum of the absolute values of the angles that the third and fourth light beams would make with said second light incident surface if said second light incident surface were perpendicular to the center optical axis of said third optical system.

25. The optical scanning device of claim 22, wherein:

said plurality of light beams includes, in order in said second direction, first, second, third, and fourth light beams that are deflected by said deflector so that said second and third light beams are parallel in said plane;

said second cylindrical lens includes first and second lens parts that are adjacent to one another in said second direction;

the first lens part includes a first light incident surface that is inclined at an angle in said plane so that the first light beam produces a straight scanning line; and the second lens part includes a second light incident surface that is inclined at an angle in said plane so that the fourth light beam produces a straight scanning line.

26. The optical scanning device of claim 21, and further including a plurality of scanned surfaces wherein each scanned surface is on a different one of a plurality of photosensitive drums, and each of said plurality of light beams scans one of said plurality of scanned surfaces.

* * * * *

UNITED STATES PATENT AND TRADEMARK OFFICE
CERTIFICATE OF CORRECTION

PATENT NO. : 6,914,705 B2
DATED : July 5, 2005
INVENTOR(S) : Nakai

It is certified that error appears in the above-identified patent and that said Letters Patent is hereby corrected as shown below:

Column 6,
Line 16, change "pass" to -- passes --;

Column 7,
Line 1, change "collima tor" to -- collimator --;

Column 8,
Line 67, change "S2'" to -- S2 --;

Column 9,
Line 15, change "|α1 + |α2|" to -- |α1| + |α2| --;

Column 10,
Line 5, change "beam" to -- beams --;
Lines 36 and 37, change "spot" to -- spots --;
Line 38, change "passes" to -- pass --;
Line 40, change "spot" to -- spots --; and Column 12,
Line 51, change "pass" to -- passes --.

Signed and Sealed this

Twentieth Day of September, 2005

JON W. DUDAS
*Director of the United States Patent and Trademark Office*